United States Patent
Luo et al.

(10) Patent No.: US 10,759,886 B2
(45) Date of Patent: Sep. 1, 2020

(54) SINGLE REACTOR PRODUCTION OF POLYMERS IN GAS OR SLURRY PHASE

(71) Applicant: ExxonMobil Chemical Patents Inc., Baytown, TX (US)

(72) Inventors: Lubin Luo, Houston, TX (US); Jeanette M. Diop, Houston, TX (US); Jian Yang, Houston, TX (US); Sudhin Datta, Houston, TX (US); Patrick Brant, Seabrook, TX (US)

(73) Assignee: ExxonMobil Chemical Patents Inc., Baytown, TX (US)

( * ) Notice: Subject to any disclaimer, the term of this patent is extended or adjusted under 35 U.S.C. 154(b) by 0 days.

(21) Appl. No.: 15/570,814

(22) PCT Filed: May 27, 2016

(86) PCT No.: PCT/US2016/034760
§ 371 (c)(1),
(2) Date: Oct. 31, 2017

(87) PCT Pub. No.: WO2016/196334
PCT Pub. Date: Dec. 8, 2016

(65) Prior Publication Data
US 2018/0179309 A1   Jun. 28, 2018

Related U.S. Application Data

(60) Provisional application No. 62/205,977, filed on Aug. 17, 2015, provisional application No. 62/206,004, filed on Aug. 17, 2015, provisional application No. 62/171,590, filed on Jun. 5, 2015.

(51) Int. Cl.
*C08F 210/06* (2006.01)
*C08F 210/16* (2006.01)
*C08F 4/6592* (2006.01)

(52) U.S. Cl.
CPC .......... *C08F 210/06* (2013.01); *C08F 210/16* (2013.01)

(58) Field of Classification Search
CPC ................... C08F 4/65927; C08F 210/06
See application file for complete search history.

(56) References Cited

U.S. PATENT DOCUMENTS

| | | | |
|---|---|---|---|
| 5,049,535 A | 9/1991 | Resconi et al. |
| 5,276,208 A | 1/1994 | Winter et al. |
| 5,278,264 A | 1/1994 | Spaleck et al. |
| 5,411,994 A | 5/1995 | Galli et al. |
| 5,459,117 A | 10/1995 | Ewen |
| 5,532,396 A | 7/1996 | Winter et al. |
| 5,539,076 A | 7/1996 | Nowlin et al. |
| 5,543,373 A | 8/1996 | Winter et al. |
| 5,547,756 A | 8/1996 | Kamo et al. |
| 5,585,509 A | 12/1996 | Langhauser et al. |
| 5,589,549 A | 12/1996 | Govoni et al. |
| 5,631,202 A | 5/1997 | Ewen |
| 5,661,098 A | 8/1997 | Harrison et al. |
| 5,696,045 A | 12/1997 | Winter et al. |
| 5,700,886 A | 12/1997 | Winter et al. |
| 5,770,753 A | 6/1998 | Kueber et al. |
| 5,786,432 A | 7/1998 | Kueber et al. |
| 5,840,644 A | 11/1998 | Kueber et al. |
| 5,990,242 A | 11/1999 | Naga et al. |
| 5,869,584 A | 12/1999 | Winter et al. |
| 6,001,764 A | 12/1999 | Pullukat et al. |
| 6,028,140 A | 2/2000 | Collina et al. |
| 6,051,727 A | 4/2000 | Kueber et al. |
| 6,069,213 A | 5/2000 | Nemzek et al. |
| 6,121,182 A | 9/2000 | Okumura et al. |
| 6,150,481 A | 11/2000 | Winter et al. |
| 6,174,930 B1 | 1/2001 | Agarwal et al. |
| 6,242,544 B1 | 6/2001 | Kueber et al. |
| 6,255,506 B1 | 7/2001 | Kueber et al. |
| 6,262,195 B1 | 7/2001 | Dall'Occo et al. |
| 6,329,315 B1 | 12/2001 | Denton et al. |
| 6,350,830 B1 | 2/2002 | Gores et al. |
| 6,376,627 B1 | 4/2002 | Burkhardt et al. |
| 6,399,533 B2 | 6/2002 | Sacchetti et al. |
| 6,429,250 B1 | 8/2002 | Rohrmann et al. |
| 6,444,833 B1 | 9/2002 | Ewen et al. |
| 6,492,465 B1 | 12/2002 | Burkhardt et al. |
| 6,559,252 B1 | 5/2003 | Horton et al. |
| 6,608,224 B2 | 8/2003 | Resconi et al. |

(Continued)

FOREIGN PATENT DOCUMENTS

| CN | 102731691 | 2/2014 |
|---|---|---|
| EP | 0576970 | 1/1994 |

(Continued)

OTHER PUBLICATIONS

Severn et al., Editors, Tailor-Made Polymers, 2008, p. 103.
U.S. Appl. No. 16/301,596, filed Nov. 14, 2018.
Pasquini, N. (Ed.), Polypropylene Handbook, 2005, 2nd Ed., Hanser Publishers, Munich, pp. 78-89.
Shinamoto et al., "Microspherical Silica Supports with High Pore Volume for Metallocene Catalysts," presented at Metallocenes Europe '97 Dusseldorf, Germany, Apr. 8-9, 1997.
U.S. Appl. No. 15/570,809, filed Oct. 31, 2017 Yang et al.
U.S. Appl. No. 15/570,835, filed Oct. 31, 2017 Luo.
U.S. Appl. No. 15/570,849, filed Oct. 31, 2017 Luo.
U.S. Appl. No. 15/644,528, filed Oct. 26, 2017 Luo et al.
U.S. Appl. No. 15/722,926, filed Oct. 2, 2017 Luo et al.

(Continued)

*Primary Examiner* — Caixia Lu
(74) *Attorney, Agent, or Firm* — Catherine L. Bell

(57) ABSTRACT

Disclosed are methods for the production of polymers, including random copolymers (RCPs), in single reactor gas or slurry phase polymerization processes, and polymer compositions produced therefrom. The methods enable polymers having low melting temperatures to be made in gas and slurry phase polymerization processes, where they conventionally could not be made in these processes due to stickiness and fouling problems in the reactor.

30 Claims, 2 Drawing Sheets

(56) References Cited

U.S. PATENT DOCUMENTS

| | | |
|---|---|---|
| 6,635,779 B1 | 10/2003 | Ewen et al. |
| 6,673,736 B2 | 1/2004 | Kellumet et al. |
| 6,777,366 B2 | 8/2004 | Gauthier et al. |
| 6,777,367 B2 | 8/2004 | Gauthier et al. |
| 6,787,616 B2 | 9/2004 | Takemori et al. |
| 6,841,501 B2 | 1/2005 | Resconi et al. |
| 6,846,943 B2 | 1/2005 | Nakano et al. |
| 6,855,783 B2 | 2/2005 | Gauthier et al. |
| 6,870,016 B1 | 3/2005 | Burkhardt et al. |
| 6,878,786 B2 | 4/2005 | Resconi et al. |
| 6,916,886 B2 | 7/2005 | Morioka et al. |
| 6,949,614 B1 | 9/2005 | Schottek et al. |
| 6,953,829 B2 | 10/2005 | Kratzer et al. |
| 6,992,153 B1 | 1/2006 | Collina et al. |
| 7,034,173 B2 | 4/2006 | Schottek |
| 7,122,498 B2 | 10/2006 | Hart et al. |
| 7,141,527 B1 | 11/2006 | Van Baar et al. |
| 7,314,903 B2 | 1/2008 | Resconi et al. |
| 7,342,078 B2 | 3/2008 | Schottek et al. |
| 7,405,261 B2 | 7/2008 | Schulte et al. |
| 7,452,949 B2 | 11/2008 | Okumura et al. |
| 7,569,651 B2 | 8/2009 | Schottek et al. |
| 7,615,597 B2 | 11/2009 | Resconi et al. |
| 7,799,880 B2 | 9/2010 | Ciaccia |
| 7,829,495 B2 | 11/2010 | Floyd et al. |
| 7,964,679 B2 | 6/2011 | Resconi et al. |
| 7,985,799 B2 | 7/2011 | Resconi et al. |
| 8,222,356 B2 | 7/2012 | Kipke et al. |
| 8,299,287 B2 | 10/2012 | Dimeska et al. |
| 8,318,872 B2 | 11/2012 | Savatsky et al. |
| 8,399,375 B2 | 3/2013 | Itan et al. |
| 8,415,492 B2 | 4/2013 | Sell et al. |
| 8,507,706 B2 | 8/2013 | Dimeska et al. |
| 8,557,917 B2 | 10/2013 | Leskinen et al. |
| 8,729,206 B2 | 5/2014 | Resconi et al. |
| 9,193,856 B2 | 11/2015 | Ebata et al. |
| 9,249,239 B2 | 2/2016 | Yang et al. |
| 9,376,559 B2 | 6/2016 | Holtcamp et al. |
| 9,458,257 B2 | 10/2016 | Funaya et al. |
| 9,464,145 B2 | 10/2016 | Yang et al. |
| 9,644,047 B2 | 5/2017 | Yang et al. |
| 9,718,900 B2 | 8/2017 | Giesbrecht |
| 9,725,537 B2 | 8/2017 | Luo et al. |
| 9,725,569 B2 | 8/2017 | Holtcamp et al. |
| 9,738,779 B2 | 8/2017 | Luo et al. |
| 9,745,390 B2 | 8/2017 | Yang et al. |
| 9,809,664 B2 | 11/2017 | Luo et al. |
| 9,834,628 B2 | 12/2017 | Canich et al. |
| 9,920,176 B2 | 3/2018 | Luo et al. |
| 9,944,665 B2 | 4/2018 | Yang et al. |
| 10,077,325 B2 | 9/2018 | Luo et al. |
| 10,119,016 B2 | 11/2018 | Luo et al. |
| 2001/0053833 A1 | 12/2001 | Nakano et al. |
| 2002/0147105 A1 | 10/2002 | Shamshoum et al. |
| 2003/0171207 A1 | 9/2003 | Shih et al. |
| 2003/0236365 A1 | 12/2003 | Tian et al. |
| 2004/0204310 A1 | 10/2004 | Gauthier et al. |
| 2005/0003951 A1 | 1/2005 | Ferraro et al. |
| 2005/0085376 A1 | 4/2005 | Nagy et al. |
| 2005/0182266 A1 | 8/2005 | Schulte et al. |
| 2007/0004814 A1 | 1/2007 | Resconi et al. |
| 2007/0055021 A1 | 3/2007 | Chandrashekar et al. |
| 2007/0179051 A1 | 8/2007 | Mihan et al. |
| 2009/0018267 A1 | 1/2009 | Vestberg et al. |
| 2009/0062492 A1 | 3/2009 | Luo et al. |
| 2009/0259007 A1 | 10/2009 | Ciaccia |
| 2010/0267907 A1 | 10/2010 | Dimeska et al. |
| 2011/0034649 A1 | 2/2011 | Standaert et al. |
| 2011/0160373 A1 | 2/2011 | Bernreitner et al. |
| 2011/0081817 A1 | 4/2011 | Bieser et al. |
| 2011/0112262 A1 | 5/2011 | Gauthier et al. |
| 2011/0230630 A1 | 9/2011 | Sell et al. |
| 2013/0253124 A1 | 9/2013 | Bernreiter et al. |
| 2013/0345376 A1 | 12/2013 | Luo et al. |
| 2014/0121325 A1* | 5/2014 | Holtcamp ............... C08L 23/14 525/195 |
| 2014/0221514 A1 | 8/2014 | Datta et al. |
| 2014/0303308 A1 | 10/2014 | Grestenberger et al. |
| 2014/0357771 A1 | 12/2014 | Tranninger et al. |
| 2015/0025205 A1 | 1/2015 | Yang et al. |
| 2015/0025205 A1 | 1/2015 | Yang et al. |
| 2015/0119537 A1 | 4/2015 | Holtcamp et al. |
| 2015/0147552 A1* | 5/2015 | Holtcamp ............. C08F 210/16 428/220 |
| 2015/0183893 A1 | 7/2015 | Yang et al. |
| 2016/0032025 A1 | 2/2016 | Giesbrecht |
| 2016/0137763 A1 | 5/2016 | Holtcamp et al. |
| 2016/0244539 A1 | 8/2016 | Resconi et al. |
| 2016/0335619 A1 | 12/2016 | Ye et al. |
| 2016/0355618 A1 | 12/2016 | Luo et al. |
| 2016/0355653 A1 | 12/2016 | Holtcamp et al. |
| 2016/0355654 A1 | 12/2016 | Luo et al. |
| 2016/0355655 A1 | 12/2016 | Luo et al. |
| 2016/0355656 A1 | 12/2016 | Luo et al. |
| 2016/0355657 A1 | 12/2016 | Luo et al. |
| 2017/0253656 A1 | 9/2017 | Penta et al. |
| 2017/0306136 A1 | 10/2017 | Luo et al. |
| 2017/0342175 A1 | 11/2017 | Hagadorn et al. |
| 2018/0022843 A1 | 1/2018 | Luo et al. |
| 2018/0142045 A1 | 1/2018 | Luo |
| 2018/0142046 A1 | 5/2018 | Luo |
| 2018/0162964 A1 | 6/2018 | Yang et al. |

FOREIGN PATENT DOCUMENTS

| | | |
|---|---|---|
| EP | 0834519 | 4/1998 |
| EP | 1205493 | 5/2002 |
| EP | 1380598 | 1/2004 |
| EP | 1541598 | 6/2005 |
| JP | 2003-073414 | 3/2003 |
| JP | 2012-214709 | 11/2012 |
| WO | 01/48034 | 7/2001 |
| WO | 01/58970 | 8/2001 |
| WO | 02/02575 | 1/2002 |
| WO | 02/02576 | 1/2002 |
| WO | 03/002583 | 1/2003 |
| WO | 03/045551 | 6/2003 |
| WO | 03/051934 | 6/2003 |
| WO | 2004/052945 | 6/2004 |
| WO | 2004/092225 | 10/2004 |
| WO | 2004/106351 | 12/2004 |
| WO | 2014/016318 | 1/2014 |
| WO | 2015/009480 | 1/2015 |
| WO | 2015/065676 | 5/2015 |
| WO | 2015/070360 | 5/2015 |
| WO | 2016/196331 | 12/2016 |
| WO | 2016/196334 | 12/2016 |
| WO | 2016/196339 | 12/2016 |
| WO | 2016/197014 | 12/2016 |
| WO | 2016/197037 | 12/2016 |
| WO | 2017/204830 | 11/2017 |

OTHER PUBLICATIONS

Resconi et al., "Metallocene Catalysts for Propylene Polymerization," Polypropylene Handbook, Pasquini, Ed., Chapter 2.2, Hanser Publications, Munic, 2005.

Schmidt et al., "Synthesis and characterization of unbridged metallocene dichloride complexes with two differently mono-substituted indenyl ligands and their application as catalysts for the polymerization of ethane and propene," Journal of Molecular Catalysis A: Chemical, 2001, 172 (1-2), pp. 43-65.

Tynys et al., "Ethylene-Propylene Copolymerizations: Effect of Metallocene Structure on Termination Reactions and Polymer Miscrostructure," Macromolecular Chemical Phys., 2005, vol. 206, pp. 1043-1056.

Imhoff et al., "Characterization of Methylaluminoxanes and Determination of Trimethylaluminum Using Proton NMR", Organometallics, 1998, vol. 17, pp. 1941-1945.

(56) References Cited

OTHER PUBLICATIONS

Kaminsky, "Highly Active Metallocene Catalysts for Olefin Polymerization ," Journal of Chemical Society, Dalton Trans., 1998, pp. 1413-1418.

Sinn, "Proposals for Structure and Effect of Methylalumoxane Based on Mass Balances and Phase Separation Experiments," Macromolecular Symposia, 1995, vol. 97, Issue 1, pp. 27-52.

Mortazavi et al., "Characterization of MAO-Modified Silicas for Ethylene Polymerization," Journal of Applied Polymer Science, 2013, vol. 130, No. 6, pp. 4568-4575.

Chen et al., "Preparation and characterization of agglomerated porous hollow silica supports for olefin polymerization catalyst," Journal of Non-Crystalline Solids, 2007, vol. 353, No. 11-12, pp. 1030-1036.

Smit et al., "Effects of Methylaluminoxane Immobilization on Silica on the Performance of Zirconocene Catalysts in Propylene Polymerization," Journal of Polymer Science: Part A: Polymer Chemistry, 2005, vol. 43, pp. 2734-2748.

Von Hohenesche et al., "Agglomerated non-porous silica nanoparticles as model carriers in polyethylene synthesis," Journal of Molecular Catalysis A: Chemical, Elsevier, Amsterdam, NL, 2004, vol. 221, No. 1-2, pp. 185-199.

Cecchin et al, "On the Mechanism of Polypropene Growth over $MgCl_2/TiCl_4$ Catalyst Systems," Macromolecular Chemistry and Physics, 2001, vol. 202, No. 10, p. 1987-1994.

D'Agnillo et al., "Controlling Molecular Weight Distributions of Polyethylene by Combining Soluble Metallocene/MAO Catalysts," Journal of Polymer Science Part A: Polymer Chemistry, 1998, vol. 36, No. 5, pp. 831-840.

Zheng et al., "Fragmentation Behavior of Silica-Supported Metallocene/MAO Catalysts in the Early Staaes of Olefin Polymerization." Macromolecules. 2005. vol. 35. No. 11. pp. 4673-4678.

U.S. Appl. No. 62/701,898, filed Jul. 23, 2018, ExxonMobil Chemical Patents Inc.

\* cited by examiner

SINGLE REACTOR PRODUCTION OF POLYMERS IN GAS OR SLURRY PHASE

PRIORITY

This application is the National Stage application for PCT/US2016/034760, filed May 27, 2016, which claims priority to and the benefit of U.S. Ser. No. 62/205,977, filed Aug. 17, 2015; U.S. Ser. No. 62/206,004, filed Aug. 17, 2015; and U.S. Ser. No. 62/171,590, filed Jun. 5, 2015.

CROSS REFERENCE TO RELATED APPLICATIONS

This invention also relates to: PCT Application PCT/US2016/034755, filed May 27, 2016; PCT Application PCT/US2016/034784, filed May 27, 2016; and PCT Application PCT/US2016/034768, filed May 27, 2016.

FIELD OF THE INVENTION

Disclosed are methods for the production of polymers, including random copolymers (RCPs), in single reactor gas or slurry phase polymerization processes, and polymer compositions produced therefrom. The methods enable polymers having low melting temperatures to be made in gas and slurry phase polymerization processes, where they conventionally could not be made in these processes due to stickiness and fouling problems in the reactor.

BACKGROUND OF THE INVENTION

Random copolymers (RCPs), such as propylene-based RCPs, are useful in applications where good optical properties and/or lower meting temperature for sealing performance are required. As comonomer content increases (e.g., ethylene content) in RCPs, they will become sticky at a certain point. The point at which they become sticky may vary with temperature and catalyst system. For example, Ziegler-Natta catalyzed RCPs with 6-7 wt % or higher ethylene or certain metallocene (MCN) catalyzed RCPs with 2-3 wt % or higher (i.e., 3-4 mol % or higher) ethylene have not generally been produced in slurry or gas phase reactors at desired temperatures (e.g., 50-80° C.) due to stickiness and reactor fouling problems. See Resconi, L., Fritze, C., "Metallocene Catalysts for Propylene Polymerization," Pasquini N (ed), Polypropylene Handbook, $2^{nd}$ Edition, Hanser Publisher, Munich (2005), 117 and 13. The melting temperature difference between Ziegler-Natta derived RCPs and MCN derived RCPs is thought to be a major cause of the different ethylene incorporation limits.

Given these issues, polymers such as RCPs having an ethylene content above a certain point generally must be produced in solution phase polymerization processes utilizing a solvent at temperatures above 120° C., and typically above 135° C. The reactor effluent in these processes is a liquid solution comprising the polymer and a substantial amount of solvent. To obtain the final product, the solvent must be separated from the polymer. To do this, the reactor effluent is typically heated under pressure in a separator to create a solvent-rich phase and a polymer-rich phase, and then both phases are subject to further separation by bifractionation. The process is time-consuming and not cost effective.

It would be more efficient and economical to be able to make these polymers using a supported catalyst system in gas or slurry phase. Gas phase processes do not require substantial use of solvents or the corresponding sophisticated separation processes. In these processes, the reactor is typically a fluidized bed comprising monomer and comonomer primarily in the gas phase and fluidized solid particles comprising catalyst components and polymer. The reactor effluent comprises solid polymer granules, rather than a liquid solution of polymer in solvent. Slurry processes, on the other hand, still use substantial amounts of solvents but usually involve much simpler processes for separating solvent from the product than solution phase processes.

Both gas and slurry processes, however, have conventionally been limited in their ability to make certain MCN catalyzed RCPs with higher than 2-3 wt % ethylene incorporation at preferred temperatures of 50-80° C. without reactor fouling. Some semi-crystalline rubbers have been produced in gas or slurry processes, but these processes require the addition of an anti-sticking agent such as carbon black to the reactor to reduce the possibility of fouling and assist in polymer handling. As such, the processes are extremely messy and often require dedicated equipment to prevent contamination. It would be advantageous to be able make these polymers in gas or slurry phase without the requirement of anti-sticking agents. It would also be advantageous to be able make RCPs with high enough comonomer content to obtain the desired Tm for heat seal properties, while maintaining the ability of the polymer to stay in granular form and be free-flowing at desired gas or slurry phase process conditions.

Recently, efforts have also been made to take advantage of newly developed MCN catalyst technology to capitalize on the benefits such catalysts provide. Polymers prepared with such single-site catalysts often have narrow molecular weight and composition distributions, low extractables, and a variety of other favorable properties. Recent efforts have also focused on new support structures for single-site catalysts, and the use of different supports to affect polymer properties. Highly porous supports, such as high surface area silicas, have been used in polymerization processes. However, such supports have not generally been used in gas or slurry phase polymerization processes for making certain MCN catalyzed RCPs with comonomer content higher than 2-3 wt %.

Background references on the use of high surface area silicas include WO 2004/092225, which discloses MCN polymerization catalysts supported on silica having a 10-50 μm particle size (PS), 200-800 $m^2/g$ surface area (SA), and 0.9 to 2.1 mL/g pore volume (PV), and shows an example of a 97 μm PS, 643 $m^2/g$ SA and 3.2 mL/g PV silica (p. 12, Table I, support E (MS3060)) used to obtain isotactic polypropylene (pp. 18-19, Tables V and VI, run 21).

EP 1 380 598 discloses certain MCN catalysts supported on silica having a 2-12 μm PS, 600-850 $m^2/g$ SA, and 0.1 to 0.8 mL/g PV, and shows an example of silica having a 6.9 μm PS, 779 $m^2/g$ SA and 0.23 mL/g PV (p. 25, Table 3, Ex. 16) to obtain polyethylene.

EP 1 541 598 discloses certain MCN catalysts supported on silica having a 2 to 20 μm PS, 350-850 $m^2/g$ SA, and 0.1 to 0.8 mL/g PV (p. 4, lines 15-35), and shows an example of a 10.5 μm PS, 648 $m^2/g$ SA and 0.51 mL/g PV silica (see p. 17, Example 12) for an ethylene polymerization.

EP 1 205 493 describes a 1126 $m^2/g$ SA and 0.8 cc/g structural porous volume (small pores only) silica support used with an MCN catalyst for ethylene copolymerization (Examples 1, 6, and 7).

JP 2003-073414 describes a 1 to 200 μm PS, 500 $m^2/g$ or more SA, and 0.2 to 4.0 mL/g PV silica, but shows examples of propylene polymerization with certain MCNs where the silica has a PS of 12 µm and 20 µm.

JP 2012-214709 describes 1.0 to 4.0 µm PS, 260 to 1000 m²/g SA, and 0.5 to 1.4 mL/g PV silica used to polymerize propylene.

Other references of interest include US 2011/0034649; US 2011/0081817; Madri Smit et al., Journal of Polymer Science: Part A: Polymer Chemistry, Vol. 43, pp. 2734-2748 (2005); and "Microspherical Silica Supports with High Pore Volume for Metallocene Catalysts," Ron Shinamoto and Thomas J. Pullukat, presented at "Metallocenes" Europe '97 Dusseldorf, Germany, Apr. 8-9, 1997.

There is need for new catalyst systems, supports, and processes that enable polymers like propylene-based RCPs with low melting temperatures (e.g., less than or equal to 140° C. or less than or equal to 135° C.) or ethylene-based copolymers with low melting temperatures (e.g., less than or equal to 110° C., 105° C., or 100° C.) to be produced in gas and slurry phase processes without the use of substantial amounts of solvents and/or anti-sticking agents. There is a need for processes that take advantage of the favorable properties that highly porous supports and single-site and MCN catalysis technology can provide to produce polymers that meet the needs of particular applications, such as providing one or more of: improved economics by making polymers in low cost in use processes, improved toughness or other properties, low extractables, bimodal MWD, bimodal composition distribution, bimodal PS distribution (PSD), and combinations thereof. There is a need for gas and slurry phase processes that enable the production of polymers such as propylene-based RCPs in a single reactor.

SUMMARY OF THE INVENTION

This invention is directed to methods comprising:
a. contacting a single-site catalyst precursor, an activator, and a support to produce a catalyst system, wherein the support comprises silica characterized by an average surface area of from 400 m²/g to 800 m²/g and an average particle size in the range of 60-200 µm;
b. contacting propylene and ethylene at a propylene to ethylene molar ratio of from 95:5 to 98:2, in single reactor with the catalyst system under polymerization conditions, wherein the reactor temperature is from about 10° C. to less than 135° C.; and
c. recovering a reactor effluent comprising a granular polymer.

This invention is also directed to methods comprising:
a. contacting a single-site catalyst precursor, an activator, and a support to produce a catalyst system, wherein the support comprises silica characterized by an average surface area of from 400 m²/g to 800 m²/g and an average particle size in the range of 60-200 µm;
b. contacting ethylene and at least one $C_3$ to $C_{12}$ olefin comonomer at an ethylene to comonomer molar ratio of from 80:20 to 90:10, in single reactor with the catalyst system under polymerization conditions, wherein the reactor temperature is from about 10° C. to less than 105° C.; and
c. recovering a reactor effluent comprising a granular polymer.

This invention is also directed to olefin polymers comprising at least 95 mol % propylene and from 3 to 5 mol % ethylene, based on the total moles of propylene and ethylene in the polymer, and having a melting temperature, Tm (DSC second melt), of less than or equal to 135° C.; wherein after storage for at least four months at room temperature, the polymers have a particle size distribution characterized by less than 10.0 wt % of particles having a diameter of more than 4000 µm, based on the total weight of particles in the polymer.

This invention is also directed to olefin polymers comprising at least 80 mol % ethylene and from 10 to 20 mol % at least one $C_3$ to $C_{12}$ alpha-olefin comonomer, based on the total moles of ethylene and $C_3$ to $C_{12}$ alpha-olefin comonomer in the polymer, and having a melting temperature, Tm (DSC second melt), of less than or equal to 110° C.; wherein after storage for at least four months at room temperature, the polymers have a particle size distribution characterized by less than 10.0 wt % of particles having a diameter of more than 4000 µm, based on the total weight of particles in the polymer.

DEFINITIONS AND MEASUREMENTS

Figure 1:
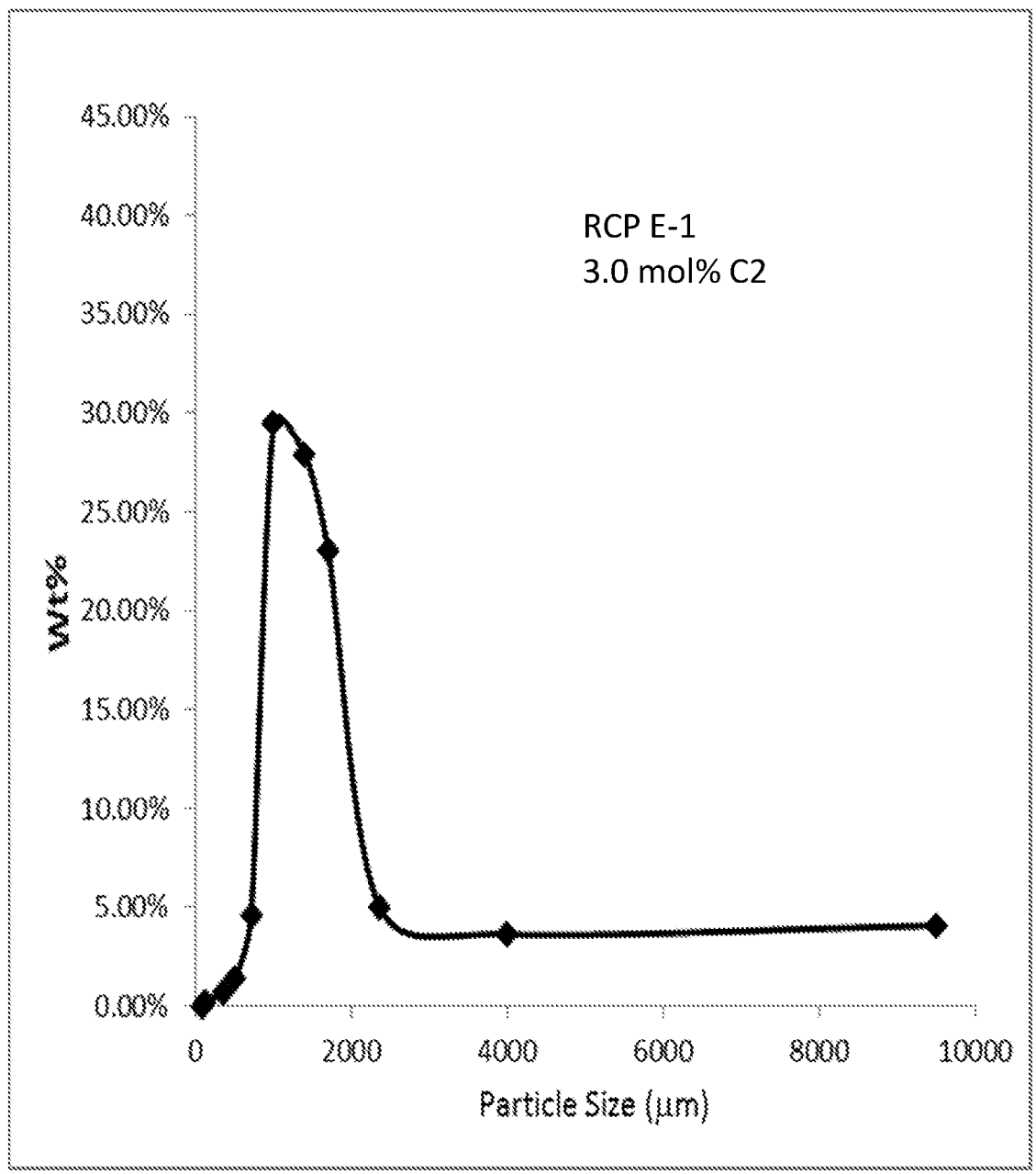
FIG. 1 provides a graph of wt % of polymer versus sieve size for a sieve experiment performed on a polymer produced as described in the experimental section.

For purposes of this disclosure, the new numbering scheme for the Periodic Table Groups is used as described in CHEMICAL AND ENGINEERING NEWS, 63(5), p. 27 (1985).

For purposes herein, particle size (PS), and distributions thereof, may be determined by laser diffraction using a LS 13 320 Laser Diffraction Particle Size Analyzer with a Micro Liquid Module (range of 0.4 to 2000 µm), available from Beckman Coulter, Inc., Brea, Calif. Unless otherwise indicated expressly or by context, "particle" refers to the overall particle body or assembly such as an aggregate, agglomerate, or encapsulated agglomerate, rather than subunits or parts of the body such as the "primary particles" in agglomerates or the "elementary particles" in an aggregate.

For purposes herein, the surface area (SA, also called the specific surface area or BET surface area), pore volume (PV), and mean or average pore diameter (PD) of catalyst support materials may be determined by the Brunauer-Emmett-Teller (BET) method using adsorption-desorption of nitrogen (temperature of liquid nitrogen: 77 K) with a MICROMERITICS ASAP 2420 instrument after degassing for 4 hours at 130° C. for silica or 40-60° C. for silica supported MAO or finished catalysts. More information regarding the method can be found, for example, in "Characterization of Porous Solids and Powders: Surface Area, Pore Size and Density," S. Lowell et al., Springer, 2004. PV refers to the total PV, including both internal and external PV.

For purposes herein, when a polymer or copolymer is referred to as comprising an olefin, the olefin present in such polymer or copolymer is the polymerized form of the olefin. For example, when a copolymer is said to have an "ethylene" content of 35 wt % to 55 wt %, it is understood that the "mer" unit in the copolymer is derived from ethylene in the polymerization reaction and said derived units are present at 35 wt % to 55 wt %, based upon the weight of the copolymer. A "polymer" has two or more of the same or different mer units. A "homopolymer" is a polymer having mer units that are the same. A "copolymer" is a polymer having two or more mer units that are different from each other. A "terpolymer" is a polymer having three mer units that are different from each other. "Different" as used to refer to mer units indicates that the mer units differ from each other by at least one atom or are different isomerically. Accordingly, the definition of copolymer, as used herein, includes terpolymers and the like.

The terms "random copolymer" or "RCP" herein refer to a copolymer comprising propylene and at least one alpha-olefin comonomer having 2 or 4 to 12 carbon atoms, where the propylene: total comonomer molar ratio is from 80:20 to 99.9:0.1.

As used herein, Mn is number average molecular weight, Mw is weight average molecular weight, Mz is z average molecular weight, wt % is weight percent, and mol % is mole percent. Molecular weight distribution (MWD), also referred to as polydispersity (PDI), is defined to be Mw divided by Mn. Unless otherwise noted, all molecular weights (e.g., Mw, Mn, and Mz) are g/mol and are determined by GPC-IR as described below.

Ambient temperature also referred to herein as room temperature (RT), is 23° C. unless otherwise indicated.

In the description herein, a metallocene catalyst is defined as an organometallic compound (and may sometimes be referred to as such in context) with at least one π-bound cyclopentadienyl moiety (or substituted cyclopentadienyl moiety) and more frequently two π-bound cyclopentadienyl moieties or substituted cyclopentadienyl moieties. Indene, substituted indene, fluorine, and substituted fluorene are all substituted cyclopentadienyl moieties.

An organometallic compound is defined as a compound containing at least one bond between a carbon atom of an organic compound and a metal, and is typically, although not always, capable of deprotonating hydroxyl groups, e.g., from a support material. A deprotonating agent is defined as a compound or system capable of deprotonating hydroxyl groups from the support, and may be an organometallic or another compound such as a metal amide, e.g., aluminum amide or lithium amide.

An "anionic ligand" is a negatively charged ligand, which donates one or more pairs of electrons to a metal ion. A "neutral donor ligand" is a neutrally charged ligand, which donates one or more pairs of electrons to a metal ion.

The terms "hydrocarbyl radical," "hydrocarbyl," and "hydrocarbyl group" are used interchangeably throughout this document. Likewise, the terms "group," "radical," and "substituent" are also used interchangeably in this document. For purposes of this disclosure, "hydrocarbyl radical" is defined to be a radical, which contains hydrogen atoms and up to 100 carbon atoms and which may be linear, branched, or cyclic, and when cyclic, aromatic or non-aromatic. A substituted hydrocarbyl radical is a hydrocarbyl radical where at least one hydrogen has been replaced by a heteroatom or heteroatom containing group.

Halocarbyl radicals are radicals in which one or more hydrocarbyl hydrogen atoms have been substituted with at least one halogen (e.g., F, Cl, Br, I) or halogen-containing group (e.g., $CF_3$).

Silylcarbyl radicals (also called silylcarbyls) are groups in which the silyl functionality is bonded directly to the indicated atom or atoms. Examples include $SiH_3$, $SiH_2R^*$, $SiHR^*_2$, $SiR^*_3$, $SiH_2(OR^*)$, $SiH(OR^*)_2$, $Si(OR^*)_3$, $SiH_2(NR^*_2)$, $SiH(NR^*_2)_2$, $Si(NR^*_2)_3$, and the like, where R* is independently a hydrocarbyl or halocarbyl radical and two or more R* may join together to form a substituted or unsubstituted saturated, partially unsaturated or aromatic cyclic or polycyclic ring structure.

Germylcarbyl radicals (also called germylcarbyls) are groups in which the germyl functionality is bonded directly to the indicated atom or atoms. Examples include $GeH_3$, $GeH_2R^*$, $GeHR^*_2$, $GeR^*_3$, $GeH_2(OR^*)$, $GeH(OR^*)_2$, $Ge(OR^*)_3$, $GeH_2(NR^*_2)$, $GeH(NR^*_2)_2$, $Ge(NR^*_2)_3$, and the like, where R* is independently a hydrocarbyl or halocarbyl radical and two or more R* may join together to form a substituted or unsubstituted saturated, partially unsaturated or aromatic cyclic or polycyclic ring structure.

Polar radicals or polar groups are groups in which a heteroatom functionality is bonded directly to the indicated atom or atoms. They include heteroatoms of groups 1-17 either alone or connected to other elements by covalent or other interactions, such as ionic, van der Waals forces, or hydrogen bonding. Examples of functional groups include carboxylic acid, acid halide, carboxylic ester, carboxylic salt, carboxylic anhydride, aldehyde and their chalcogen (group 14) analogues, alcohol and phenol, ether, peroxide and hydroperoxide, carboxylic amide, hydrazide and imide, amidine and other nitrogen analogues of amides, nitrile, amine and imine, azo, nitro, other nitrogen compounds, sulfur acids, selenium acids, thiols, sulfides, sulfoxides, sulfones, sulfonates, phosphines, phosphates, other phosphorus compounds, silanes, boranes, borates, alanes, and aluminates. Functional groups may also be taken broadly to include organic polymer supports or inorganic support material, such as alumina, and silica. Preferred examples of polar groups include $NR^*_2$, $OR^*$, $SeR^*$, $TeR^*$, $PR^*_2$, $AsR^*_2$, $SbR^*_2$, $SR^*$, $BR^*_2$, $SnR^*_3$, $PbR^*_3$ and the like, where R* is independently a hydrocarbyl, substituted hydrocarbyl, halocarbyl or substituted halocarbyl radical as defined above and two R* may join together to form a substituted or unsubstituted saturated, partially unsaturated or aromatic cyclic or polycyclic ring structure. Also preferred are sulfonate radicals, $S(=O)_2OR^*$, where R* is defined as above. Examples include $SO_3Me$ (mesylate), $SO_3$(4-tosyl) (tosylate), $SO_3CF_3$ (triflate), $SO_3$(n-$C_4F_9$) (nonaflate), and the like.

An aryl group is defined to be a single or multiple fused ring group where at least one ring is aromatic. Examples of aryl and substituted aryl groups include phenyl, naphthyl, anthracenyl, methylphenyl, isopropylphenyl, tert-butylphenyl, cyclopropyl, cyclobutyl, cyclopentyl, cyclohexyl, carbazolyl, indolyl, pyrrolyl, and cyclopenta[b]thiopheneyl. Preferred aryl groups include phenyl, benzyl, carbazolyl, naphthyl, and the like.

In using the terms "substituted cyclopentadienyl," or "substituted indenyl," or "substituted aryl," the substitution to the aforementioned is on a bondable ring position, and each occurrence is selected from hydrocarbyl, substituted hydrocarbyl, halocarbyl, substituted halocarbyl, silylcarbyl, germylcarbyl, a halogen radical, or a polar group. A "bondable ring position" is a ring position that is capable of bearing a substituent or bridging substituent. For example, cyclopenta[b]thienyl has five bondable ring positions (at the carbon atoms) and one non-bondable ring position (the sulfur atom); cyclopenta[b]pyrrolyl has six bondable ring positions (at the carbon atoms and at the nitrogen atom). Thus, in relation to aryl groups, the term "substituted" indicates that a hydrogen group has been replaced with a hydrocarbyl, substituted hydrocarbyl, halocarbyl, substituted halocarbyl, silylcarbyl, germylcarbyl, a halogen radical, or a polar group. For example, "methyl phenyl" is a phenyl group having had a hydrogen replaced by a methyl group.

As used herein, the term "granular" means that the product is in particle form and preferably free-flowing according to any one or more of the definitions for free-flowing provided herein.

As used herein, "and/or" means either or both (or any or all) of the terms or expressions to which the term is referring.

DETAILED DESCRIPTION OF THE INVENTION

This invention enables a variety of polymers, including MCN or single-site catalyzed polymers with a low Tm (e.g., less than or equal to 140° C. or 135° C. for propylene-based RCPs or less than or equal to 110° C., 105° C., or 100° C. for ethylene-based copolymers) to be made in gas and slurry phase polymerization processes where this was not previously possible due to stickiness and fouling problems in the reactor. The methods use a supported catalyst system comprising a single-site catalyst precursor, an activator, and a support in a single reactor polymerization process. Preferred embodiments of the catalyst system, support, activator, catalyst precursor compound, and co-activator are described in more detail below.

Support Materials:

The catalyst systems comprise porous solid particles as an inert support material to which the catalyst precursor compound and/or activator may be anchored, bound, adsorbed or the like. The support material comprises an inorganic oxide in a finely divided form. Suitable inorganic oxide materials for use in the single-site catalyst systems herein include groups 2, 4, 13, and 14 metal oxides, such as silica, alumina, magnesia, titania, zirconia, and the like, and mixtures thereof. Also, combinations of these support materials may be used, for example, silica-chromium, silica-alumina, silica-titania, and the like.

In preferred embodiments of the invention, the support material comprises silica, e.g., amorphous silica, which may include a hydrated surface presenting hydroxyl or other groups which can be deprotonated to form reactive sites to anchor activators and/or catalyst precursors. Other porous support materials may optionally be present with the silica as a co-support, for example, talc, other inorganic oxides, zeolites, clays, organoclays, or any other organic or inorganic support material and the like, or mixtures thereof. The support's surface may also be treated with different element-containing agents to form, for example, a silated, aminated, boronated, or halogenated support. The most common support is silica. Silicas which may be suitable are commercially available under the trade designations PD 13054 or PD 14024 (PQ Corporation); D70-120A, D100-100A, and D150-60A (Asahi Glass Co., Ltd. Or AGC Chemicals Americas, Inc.), and the like.

When a silica support is referred to herein, the silica support in raw form comprises at least 60 wt %, 70 wt %, 80 wt %, 90 wt %, 95 wt %, 98 wt %, or 99 wt % or more of silica. The silica support may comprise up to 5 wt %, 10 wt %, 20 wt %, 30 wt %, or 40 wt % of another compound. The other compound may be any other support material discussed herein. The other compound may be a titanium, aluminum, boron, magnesium, or mixtures thereof. Additionally, the other compound may be a talc, other inorganic oxide, zeolite, clay, organoclay, or mixtures thereof. The silica support may also not include any substantial amount of any other compound, i.e., the silica support comprises less than 5 wt %, 1 wt %, 0.5 wt %, 0.2 wt %, or less of any other compound.

Supports useful herein comprise silica and are characterized by a relatively high average surface area of from 400 to 800 m$^2$/g and an average PS in the range of 60-200 µm. They may comprise an activator, such as an aluminoxane activator, and have an aluminoxane loading of at least 7 mmol, 7.5 mmol, 8 mmol, 8.5 mmol, or 9 mmol Al/g silica.

The support may have one or more of the following characteristics:

a) an average PS of more than 50 µm, more than 60 µm, more than 65 µm, more than 70 µm, more than 75 µm, more than 80 µm, more than 85 µm, more than 90 µm, more than 100 µm, more than 120 µm, and/or up to 200 µm; or less than 180 µm, less than 160 µm, less than 150 µm, less than 130 µm; e.g., 30-200 µm, 50-200 µm, or 60-200 µm;

b) a PV from at least 0.1 mL/g, at least 0.15 mL/g, at least 0.2 mL/g, at least 0.25 mL/g, at least 0.3 mL/g, at least 0.5 mL/g, and/or up to 2 mL/g; or less than 1.6 mL/g, less than 1.5 mL/g, less than 1.4 mL/g, less than 1.3 mL/g; e.g., 0.5-2 mL/g, 0.5-1.5 mL/g, or 1.1-1.6 mL/g;

c) a SA of less than 850 m$^2$/g, less than 800 m$^2$/g, less than 750 m$^2$/g, less than 700 m$^2$/g, less than 650 m$^2$/g, and/or more than 400 m$^2$/g; or more than 600 m$^2$/g, more than 650 m$^2$/g, more than 700 m$^2$/g; e.g., 400-850 m$^2$/g, 600-850 m$^2$/g, 650-850 m$^2$/g, 700-850 m$^2$/g, 400-650 m$^2$/g, or 400-700 m$^2$/g;

d) a mean pore diameter (PD) greater than 6 nm, greater than 7 nm, greater than 8 nm, and/or less than 20 nm; less than 15 nm, less than 13 nm, less than 12 nm, less than 10 nm, less than 8 nm, less than 7 nm, or less than 6 nm; e.g., 6-13 nm, 8-13 nm, 7-20 nm, or 8-20 nm;

e) silica, e.g., amorphous silica and/or silica having a hydrated surface; and/or f) any combination or sub-combination thereof.

The support material can be used wet, i.e., containing adsorbed water, or dry, that is, free of absorbed water. The amount of absorbed water can be determined by standard analytical methods, e.g., LOD (loss of drying) from an instrument such as LECO TGA 701 under conditions such as 300° C. for 3 hours. In some embodiments of the invention, wet support material (without calcining) can be contacted with the activator or another organometallic compound as otherwise described below, with the addition of additional organometallic or other scavenger compound that can react with or otherwise remove the water, such as a metal alkyl. For example, contacting wet silica with an aluminum alkyl such as AlMe$_3$, usually diluted in an organic solvent such as toluene, forms in-situ MAO, and if desired additional MAO can be added to control the desired amount of MAO loaded on the support, in a manner otherwise similar as described below for dry silica.

Drying of the support material may be done by heating or calcining above about 100° C., e.g., from about 100° C. to about 1000° C., preferably at least about 200° C. The silica support may be heated to at least 130° C., about 130° C. to about 850° C., or about 200° C. to about 600° C. for a time of 1 minute to about 100 hours, e.g., from about 12 hours to about 72 hours, or from about 24 hours to about 60 hours. The calcined support material may comprise at least some groups reactive with an organometallic compound, e.g., reactive hydroxyl (OH) groups to produce the supported catalyst systems of this invention.

Supportation:

The support may be treated with an organometallic compound to react with deprotonated reactive sites on the support surface. In general the support is treated first with an organometallic activator such as MAO, and then the supported activator is treated with a single-site catalyst precursor compound, such as an MCN compound and optionally a metal alkyl co-activator, although the MCN compound and/or co-activator can be loaded first, followed by contact with the other catalyst system components.

The support material, having reactive surface groups especially after calcining, may be slurried in a non-polar solvent and contacted with the organometallic compound (activator in this example), preferably dissolved in the solvent, preferably for a period of time in the range of from about 0.5 hours to about 24 hours, from about 2 hours to about 16 hours, or from about 4 hours to about 8 hours. Suitable non-polar solvents are materials in which, other than the support material and its adducts, all of the reactants used herein, i.e., the activator, and the single-site catalyst precursor compound, are at least partially soluble and which are liquid at reaction temperatures. Preferred non-polar solvents are alkanes, such as isopentane, hexane, n-heptane, octane, nonane, and decane, although a variety of other materials including cycloalkanes, such as cyclohexane, aromatics, such as benzene, toluene, and ethylbenzene, may also be employed.

The mixture of the support material and activator (or other organometallic compound) in various embodiments of the invention may generally be heated or maintained at a temperature of from about −60° C. up to about 130 or 140° C., such as, for example: about 40° C. or below, about RT or below, about −20° C. or below; from about 10° C. or 20° C. up to about 60° C. or about 40° C.; RT or about 25° C. or above; or from about 40° C., about 60° C., or about 80° C. up to about 100° C., or about 120° C. Where the support may be susceptible to expansion fragmentation (as defined above) during activator/catalyst precursor supportation (e.g., SA≥650 m$^2$/g, PD≤7 nm), the expansion fragmentation may be controlled through the manipulation of reaction conditions to inhibit fragmentation such as at a lower reaction temperature, e.g., −60° C.-40° C., preferably −20° C.-30° C., to achieve <10 vol % fragmented particles, preferably <5 vol % fragmented particles. For example, for silicas having a surface area of 650-800 m$^2$/g with small average pore diameters and lacking >100 Å distributions, e.g., D150-60A (64 Å) or PD-13054 (66 Å), after the addition of MAO usually at cold temperatures (e.g., −40° C.), additional hours of agitation at RT (e.g., 3 hours) can be applied without heat treatment to minimize or prevent expansion fragmentation of the silica supported MAO. For silicas having a surface area of 400-650 m$^2$/g with larger average pore diameters, e.g., D100-100A (110 Å) or D70-120A (120 Å), or a smaller average pore diameter but with substantial >100 Å distributions, e.g., PD-14024 (92 Å), after the addition of the MAO solution at a cold temperature (e.g., −10° C.), the mixture can be agitated at an elevated temperature (e.g., 100° C.) for a certain time (e.g., 3 hours) to obtain the supported activators.

The supported activator may optionally treated with another organometallic compound which is also selected as the scavenger, preferably a metal alkyl such as an aluminum alkyl, to scavenge any hydroxyl or other reactive species that may be exposed by or otherwise remaining after treatment with the first organometallic compound, e.g., hydroxyl groups on surfaces exposed by fragmentation may be reacted and thereby removed by contact of the fragments with an aluminum alkyl such as triisobutylaluminum (TIBAL). Useful metal alkyls which may be used according to some embodiments of the invention to treat the support material have the general formula R$_n$-M, wherein R is C$_1$-C$_{40}$ hydrocarbyl such as C$_1$-C$_{12}$ alkyl, for example, M is a metal, and n is equal to the valence of M, and may include oxophilic species such as diethyl zinc and aluminum alkyls, such as, for example, trimethylaluminum, triethylaluminum, triisobutylaluminum, tri-n-hexylaluminum, tri-n-octylaluminum and the like, including combinations thereof. Then the activator/support material is contacted with a solution of the catalyst precursor compound. In some embodiments of the invention, the supported activator is generated in situ. In alternate embodiments of the invention, the slurry of the support material is first contacted with the catalyst precursor compound for a period of time in the range of from about 0.5 hours to about 24 hours, from about 2 hours to about 16 hours, or from about 4 hours to about 8 hours, and the slurry of the supported MCN compound is then contacted with an organometallic-activator solution and/or organometallic-scavenger solution.

Activators: Activators are compounds used to activate any one of the catalyst precursor compounds described above by converting the neutral catalyst precursor compound to a catalytically active catalyst compound cation. Preferred activators include aluminoxane compounds, including modified aluminoxane compounds.

Aluminoxanes are generally oligomeric, partially hydrolyzed aluminum alkyl compounds containing —Al(R1)-O— sub-units, where R1 is an alkyl group, and may be produced by the hydrolysis of the respective trialkylaluminum compound. Examples of aluminoxane activators include methylaluminoxane (MAO), ethylaluminoxane, butylaluminoxane, isobutylaluminoxane, modified MAO (MMAO), halogenated MAO where the MAO may be halogenated before or after MAO supportation, dialkylaluminum cation enhanced MAO, surface bulky group modified MAO, and the like. MMAO may be produced by the hydrolysis of trimethylaluminum and a higher trialkylaluminum such as triisobutylaluminum. Mixtures of different aluminoxanes may also be used as the activator(s).

There are a variety of methods for preparing aluminoxanes suitable for use in the present invention, non-limiting examples of which are described in U.S. Pat. Nos. 4,665,208; 4,952,540; 5,041,584; 5,091,352; 5,206,199; 5,204,419; 4,874,734; 4,924,018; 4,908,463; 4,968,827; 5,308,815; 5,329,032; 5,248,801; 5,235,081; 5,157,137; 5,103,031; 5,391,793; 5,391,529; 5,693,838; 5,731,253; 5,731,451; 5,744,656; 5,847,177; 5,854,166; 5,856,256; and 5,939,346; and European publications EP-A-0 561 476; EP-B1-0 279 586; EP-A-0 594-218; and EP-B 1-0 586 665; and PCT publications WO 94/10180 and WO 99/15534; halogenated MAO are described in U.S. Pat. Nos. 7,960,488; 7,355,058; and 8,354,485; dialkylaluminum cation enhanced MAO are described in US 2013/0345376; and surface bulky group modified supported MAO are described in U.S. Pat. No. 8,895,465, all of which are herein fully incorporated by reference.

The term "non-coordinating anion" (NCA) means an anion which either does not coordinate to a cation or which is only weakly coordinated to a cation thereby remaining sufficiently labile to be displaced by a neutral Lewis base. The term NCA is also defined to include multicomponent NCA-containing activators, such as N,N-dimethylanilinium tetrakis(pentafluorophenyl)borate, that contain an acidic cationic group and the non-coordinating anion. The term NCA is also defined to include neutral Lewis acids, such as tris(pentafluorophenyl)boron, that can react with a catalyst to form an activated species by abstraction of an anionic group. An NCA coordinates weakly enough that a neutral Lewis base, such as an olefinically or acetylenically unsaturated monomer can displace it from the catalyst center. Any metal or metalloid that can form a compatible, weakly coordinating complex may be used or contained in the non-coordinating anion. Suitable metals include, but are not limited to, aluminum, gold, and platinum. Suitable metalloids include, but are not limited to, boron, aluminum, phosphorus, and silicon. A stoichiometric activator can be either neutral or ionic. The terms ionic activator, and stoichiometric ionic activator can be used interchangeably. Likewise, the terms neutral stoichiometric activator, and Lewis acid activator can be used interchangeably. The term non-coordinating anion includes neutral stoichiometric activators, ionic stoichiometric activators, ionic activators, and Lewis acid activators.

"Compatible" non-coordinating anions are those which are not degraded to neutrality when the initially formed complex decomposes. Further, the anion will not transfer an anionic substituent or fragment to the cation so as to cause it to form a neutral transition metal compound and a neutral by-product from the anion. Non-coordinating anions useful in this invention are those that are compatible, stabilize the transition metal cation in the sense of balancing its ionic charge at +1, and yet retain sufficient ability to permit displacement during polymerization.

It is within the scope of this invention to use an ionizing or stoichiometric activator, neutral or ionic, such as tri (n-butyl) ammonium tetrakis (pentafluorophenyl) borate, a tris perfluorophenyl boron metalloid precursor or a tris perfluoronaphthyl boron metalloid precursor, polyhalogenated heteroborane anions (WO 98/43983), boric acid (U.S. Pat. No. 5,942,459), or combination thereof. It is also within the scope of this invention to use neutral or ionic activators alone or in combination with alumoxane or modified alumoxane activators.

Boron-containing NCA activators represented by the formula below may be used:

$$(Z)_d^+(A^{d-})$$

wherein Z is (L-H) or a reducible Lewis Acid, L is an neutral Lewis base; H is hydrogen; (L-H)$^+$ is a Bronsted acid; A$^{d-}$ is a non-coordinating anion having the charge d−; and d is an integer from 1 to 3.

When Z is (L-H) such that the cation component is (L-H)$_d^+$, the cation component may include Bronsted acids such as protonated Lewis bases capable of protonating a moiety, such as an alkyl or aryl, from the bulky ligand metallocene containing transition metal catalyst precursor, resulting in a cationic transition metal species. When Z is a reducible Lewis acid it may be represented by the formula: (Ar$_3$C$^+$), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C$^+$), where Ph is phenyl or phenyl substituted with a heteroatom, a C$_1$ to C$_{40}$ hydrocarbyl, or a substituted C$_1$ to C$_{40}$ hydrocarbyl. The reducible Lewis acid may be triphenyl carbenium.

The anion component A$^{d-}$ may include those having the formula [M$^k$+Q$_n$]$^{d-}$ wherein k is 1, 2, or 3; n is 1, 2, 3, 4, 5, or 6, preferably 3, 4, 5 or 6; n−k=d; M is an element selected from group 13, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halo-substituted-hydrocarbyl radicals, said Q having up to 20 carbon atoms with the proviso that in not more than one occurrence is Q a halide, and two Q groups may form a ring structure. Each Q may be a fluorinated hydrocarbyl group having 1 to 20 carbon atoms, a fluorinated aryl group, or a pentafluoro aryl group. Examples of suitable A$^{d-}$ components also include diboron compounds as disclosed in U.S. Pat. No. 5,447,895, which is fully incorporated herein by reference.

In any NCAs represented by formula 2 above, the reducible Lewis acid is represented by the formula: (Ar$_3$C+), where Ar is aryl or aryl substituted with a heteroatom, a C$_1$ to C$_{40}$ hydrocarbyl, or a substituted C$_1$ to C$_{40}$ hydrocarbyl, preferably the reducible Lewis acid is represented by the formula: (Ph$_3$C+), where Ph is phenyl or phenyl substituted with a heteroatom, a C$_1$ to C$_{40}$ hydrocarbyl, or a substituted C$_1$ to C$_{40}$ hydrocarbyl.

Bulky activators may also be useful herein. A "Bulky activator" as used herein refers to anionic activators represented by the formula:

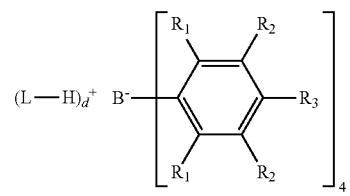

where:

each R$_1$ is, independently, a halide, preferably a fluoride;

each R$_2$ is, independently, a halide, a C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_2$ is a fluoride or a perfluorinated phenyl group); each R$_3$ is a halide, C$_6$ to C$_{20}$ substituted aromatic hydrocarbyl group or a siloxy group of the formula —O—Si—R$_a$, where R$_a$ is a C$_1$ to C$_{20}$ hydrocarbyl or hydrocarbylsilyl group (preferably R$_3$ is a fluoride or a C$_6$ perfluorinated aromatic hydrocarbyl group); wherein R$_2$ and R$_3$ can form one or more saturated or unsaturated, substituted or unsubstituted rings (preferably R$_2$ and R$_3$ form a perfluorinated phenyl ring);

L is an neutral Lewis base; (L-H)$^+$ is a Bronsted acid; d is 1, 2, or 3;

wherein the anion has a molecular weight of greater than 1020 g/mol; and wherein at least three of the substituents on the B atom each have a molecular volume of greater than 250 cubic Å, alternately greater than 300 cubic Å, or alternately greater than 500 cubic Å.

"Molecular volume" is used herein as an approximation of spatial steric bulk of an activator molecule in solution. Comparison of substituents with differing molecular volumes allows the substituent with the smaller molecular volume to be considered "less bulky" in comparison to the substituent with the larger molecular volume. Conversely, a substituent with a larger molecular volume may be considered "more bulky" than a substituent with a smaller molecular volume.

Molecular volume may be calculated as reported in "A Simple "Back of the Envelope" Method for Estimating the Densities and Molecular Volumes of Liquids and Solids," Journal of Chemical Education, Vol. 71, No. 11, November 1994, pp. 962-964. Molecular volume (MV), in units of cubic Å, is calculated using the formula: MV=8.3V$_s$, where V$_s$ is the scaled volume. V$_s$ is the sum of the relative volumes of the constituent atoms, and is calculated from the molecular formula of the substituent using the following table of relative volumes. For fused rings, the V$_s$ is decreased by 7.5% per fused ring.

| Element | Relative Volume |
| --- | --- |
| H | 1 |
| 1$^{st}$ short period, Li to F | 2 |
| 2$^{nd}$ short period, Na to Cl | 4 |
| 1$^{st}$ long period, K to Br | 5 |
| 2$^{nd}$ long period, Rb to I | 7.5 |
| 3$^{rd}$ long period, Cs to Bi | 9 |

For a list of possibly useful bulky activators see U.S. Pat. No. 8,658,556, which is incorporated by reference herein. Additionally, an NCA activator may be chosen from the activators described in U.S. Pat. No. 6,211,105, which is incorporated by reference herein.

It is also within the scope of this invention to use activators that are a combination of alumoxanes and NCAs (see for example, U.S. Pat. Nos. 5,153,157; 5,453,410; EP 0 573 120; WO 94/07928; and WO 95/14044 which discuss the use of an alumoxane in combination with an ionizing activator).

Optional Scavengers or Co-Activators:

In addition to the activator compounds, scavengers or co-activators may be used. Suitable co-activators may be selected from the group consisting of: trialkylaluminum, dialkylmagnesium, alkylmagnesium halide, and dialkylzinc. Aluminum alkyl or organoaluminum compounds which may be utilized as scavengers or co-activators include, for example, trimethylaluminum, triethylaluminum, triisobutylaluminum, tri-n-hexylaluminum, tri-n-octylaluminum, and the like. Other oxophilic species, such as diethyl zinc may be used. As mentioned above, the organometallic compound used to treat the calcined support material may be a scavenger or co-activator, or may be the same as or different from the scavenger or co-activator. In an embodiment, the co-activator is selected from the group consisting of: trimethylaluminum, triethylaluminum, triisobutylaluminum, tri-n-octylaluminum, trihexylaluminum, and diethylzinc (alternately the group consisting of: trimethylaluminum, triethylaluminum, triisobutylaluminum, trihexylaluminum, tri-n-octylaluminum, dimethylmagnesium, diethylmagnesium, dipropylmagnesium, diisopropylmagnesium, dibutyl magnesium, diisobutylmagnesium, dihexylmagnesium, dioctylmagnesium, methylmagnesium chloride, ethylmagnesium chloride, propylmagnesium chloride, isopropylmagnesium chloride, butyl magnesium chloride, isobutylmagnesium chloride, hexylmagnesium chloride, octylmagnesium chloride, methylmagnesium fluoride, ethylmagnesium fluoride, propylmagnesium fluoride, isopropylmagnesium fluoride, butyl magnesium fluoride, isobutylmagnesium fluoride, hexylmagnesium fluoride, octylmagnesium fluoride, dimethylzinc, diethylzinc, dipropylzinc, and dibutylzinc).

Single-Site Catalyst Precursor Compounds:

Single-site catalyst precursor compounds including metallocenes and non-metallocenes can be used.

The single-site catalyst precursor compounds may be represented by the following formula: $(Cp)_m R^A{}_n M^4 Q_k$; wherein each Cp is a cyclopentadienyl, indenyl, or fluorenyl moiety substituted by one or more hydrocarbyl radicals having from 1 to 20 carbon atoms; $R^A$ is a bridge between two Cp rings; $M^4$ is a transition metal selected from group 4 or 5; Q is a hydride or a hydrocarbyl group having from 1 to 20 carbon atoms or an alkenyl group having from 2 to 20 carbon atoms, or a halogen; m is 1, 2, or 3, with the proviso that if m is 2 or 3, each Cp may be the same or different; n is 0 or 1, with the proviso that n=0 if m=1; and k is such that k+m is equal to the oxidation state of $M^4$, with the proviso that if k is greater than 1, each Q may be the same or different.

The single-site catalyst precursor compounds may also be represented by the formula: $R^A(CpR''_p)(CpR^*_q)M^5 Q_r$; wherein each Cp is a cyclopentadienyl moiety or substituted cyclopentadienyl moiety; each R* and R" is a hydrocarbyl group having from 1 to 20 carbon atoms and may the same or different; p is 0, 1, 2, 3, or 4; q is 1, 2, 3, or 4; $R^A$ is a bridge between the Cp moieties imparting stereorigidity to the MCN compound; $M^5$ is a group 4, 5, or 6 metal; Q is a hydrocarbyl radical having 1 to 20 carbon atoms or is a halogen; r is s minus 2, where s is the valence of $M^5$; wherein $(CpR^*_q)$ has bilateral or pseudobilateral symmetry and $R^*_q$ is selected such that $(CpR^*_q)$ forms a fluorenyl, alkyl substituted indenyl, or tetra-, tri-, or dialkyl substituted cyclopentadienyl radical; $(CpR''_p)$ contains a bulky group in one and only one of the distal positions, wherein the bulky group is of the formula $AR^w{}_v$ and A is chosen from Group 4 metals, oxygen, or nitrogen, $R^w$ is a methyl radical or phenyl radical, and v is the valence of A minus 1.

The single-site catalyst precursor compounds may also be represented by the formula:

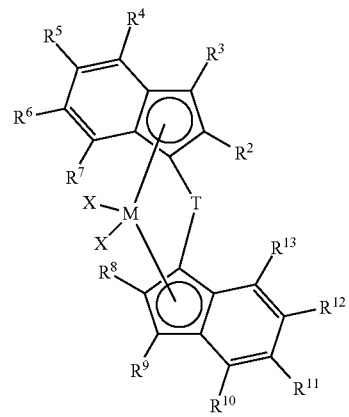

where M is a metal from group 4, 5 or 6; T is a bridging group; each X is, independently, an anionic leaving group; each $R^2$, $R^3$, $R^4$, $R^5$, $R^6$, $R^7$, $R^8$, $R^9$, $R^{10}$, $R^{11}$, $R^{12}$, and $R^{13}$ is, independently, halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a $C_1$-$C_{10}$ alkyl group, or a $C_6$-$C_{10}$ aryl group.

At least one of $R^2$, $R^3$, $R^4$, $R^5$, $R^6$, $R^7$, $R^8$, $R^9$, $R^{10}$, $R^{11}$, $R^{12}$, and $R^{13}$ may be a cyclopropyl substituent represented by the formula:

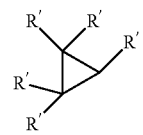

wherein each R' in the cyclopropyls substituent is, independently, hydrogen, a substituted hydrocarbyl group, an unsubstituted hydrocarbyl group, or a halogen.

In a preferred embodiment of the invention, at least one of $R^2$ and $R^8$ has at least four carbon atoms, and preferably at least six carbon atoms.

M may be selected from titanium, zirconium, hafnium, vanadium, niobium, tantalum, chromium, molybdenum and tungsten; each X may be independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups and substituted or unsubstituted $C_7$ to $C_{40}$ arylalkenyl groups; or optionally, or joined together to form a $C_4$ to $C_{40}$ alkanediyl group, or a conjugated $C_4$ to $C_{40}$ diene ligand, which is coordinated to M in a metallocyclopentene fashion; or optionally, represent a conjugated diene, optionally, substituted with one or more groups independently selected from hydrocarbyl, trihydrocarbylsilyl, and trihydrocarbylsilylhydrocarbyl groups, said diene having a total of up to 40 atoms not counting hydrogen and forming a π complex with M; each $R^2$, $R^4$, $R^8$ and $R^{10}$ may be independently selected from hydrogen, halogen, substituted or unsubstituted $C_1$ to $C_{10}$ alkyl groups, substituted or unsubstituted $C_6$ to $C_{14}$ aryl groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, substituted or unsubstituted $C_8$ to $C_{40}$ arylalkenyl groups, and —NR'$_2$, —SR', —OR', —SiR'$_3$, —OSiR'$_3$, and —PR'$_2$ radicals wherein each R' is independently selected from halogen, substituted or unsubstituted $C_1$ to $C_{10}$ alkyl groups and substituted or unsubstituted $C_6$ to $C_{14}$ aryl groups; $R^3$, $R^5$, $R^6$, $R^7$, $R^9$, $R^{11}$, $R^{12}$, and $R^{13}$ are each selected from the group consisting of hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ arylalkyl groups, substituted or unsubstituted $C_7$ to $C_{40}$ alkylaryl groups, and $C_7$ to $C_{40}$ substituted or unsubstituted arylalkenyl groups; and T is selected from:

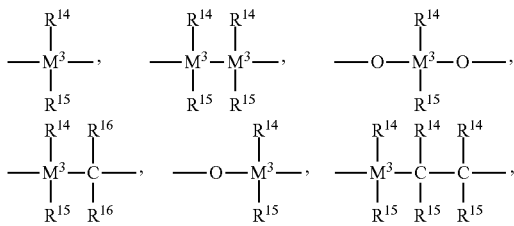

—B($R^{14}$)—, —Al($R^{14}$)—, —Ge—, —Sn—, —O—, —S—, —SO—, —SO$_2$—, —N($R^{14}$)—, —CO—, —P($R^{14}$)—, and —P(O)($R^{14}$)—; wherein $R^{14}$, $R^{15}$, and $R^{16}$ are each independently selected from hydrogen, halogen, $C_1$ to $C_{20}$ alkyl groups, $C_6$ to $C_{30}$ aryl groups, $C_1$ to $C_{20}$ alkoxy groups, $C_2$ to $C_{20}$ alkenyl groups, $C_7$ to $C_{40}$ arylalkyl groups, $C_8$ to $C_{40}$ arylalkenyl groups, and $C_7$ to $C_{40}$ alkylaryl groups, optionally, $R^{14}$ and $R^{15}$, together with the atom(s) connecting them, form a ring; and $M^3$ is selected from carbon, silicon, germanium, and tin; or T is represented by the formula:

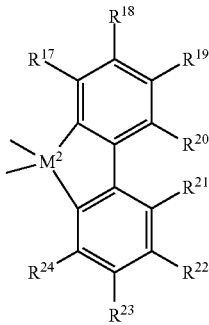

wherein $R^{17}$, $R^{18}$, $R^{19}$, $R^{20}$, $R^{21}$, $R^{22}$, $R^{23}$, and $R^{24}$ are each independently selected from hydrogen, halogen, hydroxy, substituted or unsubstituted $C_1$ to $C_{10}$ alkyl groups, substituted or unsubstituted $C_1$ to $C_{10}$ alkoxy groups, substituted or unsubstituted $C_6$ to $C_{14}$ aryl groups, substituted or unsubstituted $C_6$ to $C_{14}$ aryloxy groups, substituted or unsubstituted $C_2$ to $C_{10}$ alkenyl groups, substituted or unsubstituted $C_7$ to $C_{40}$ alkylaryl groups, substituted or unsubstituted $C_7$ to $C_{40}$ alkylaryl groups, and substituted or unsubstituted $C_8$ to $C_{40}$ arylalkenyl groups; optionally two or more adjacent radicals $R^{17}$, $R^{18}$, $R^{19}$, $R^{20}$, $R^{21}$, $R^{22}$, $R^{23}$, and $R^{24}$, including $R^{20}$ and $R^{21}$, together with the atoms connecting them, form one or more rings; and $M^2$ represents one or more carbon atoms, or a silicon, germanium, or tin atom.

Preferred single-site catalyst precursor compounds include the Type 5 metallocenes described in Resconi, L., Fritze, C., "Metallocene Catalysts for Propylene Polymerization," Pasquini N (ed), Polypropylene Handbook, 2$^{nd}$ Edition, Hanser Publisher, Munich (2005), 117, which is herein incorporated by reference in its entirety. Examples of Type 5 metallocene catalysts are listed in Table A below.

TABLE A

Examples of Type 5 MCN Catalysts

| Catalyst | Catalyst precursor name |
|---|---|
| MCN1 | [(6-methyl-8-phenyl-1,2,3-hydroindacenyl)(7-(4-tert-butylphenyl)-2-isopropyl indenyl) dimethylsilyl]zirconium dichloride |
| MCN2 | rac-dimethylsilyl bis(2-cyclopropyl-4-(3',5'-di-tert-butylphenyl)-indenyl) zirconium dichloride |
| MCN3 | rac-dimethylsilyl bis(2-methyl-4-phenyl-indenyl) zirconium dimethyl |
| MCN4 | rac-dimethylsilyl bis(2-methyl-4-(3',5'-di-tert-butyl-4'-methoxy-phenyl)-indenyl) zirconium dichloride |
| MCN5 | rac-dimethylsilyl[(4-(4'-tert-butylphenyl)-2-isopropylindenyl)(4-(4'-tert-butylphenyl)-2-methylindenyl)] zirconium dimethyl |
| MCN6 | rac-dimethylsilyl(4-o-biphenyl-2-(1-methylcyclohexyl)methyl-indenyl)(4-(3',5'-di-tert-butylphenyl)-2-methyl-indenyl)zirconium dichloride |

TABLE A-continued

Examples of Type 5 MCN Catalysts

| Catalyst | Catalyst precursor name |
|---|---|
| MCN7 | rac-dimethylsilyl bis(2-cyclopropyl-4-(3',5'-di-tert-butylphenyl)-indenyl) hafnium dichloride |
| MCN8 | rac-pentamethylenesilylene-bis(2,4,7-trimethylindenyl)hafnium(IV) dimethyl |
| MCN9 | rac-dimethylsilyl(4-(3',5'-di-tert-butyl-4'-methoxy-phenyl)-2-methyl indenyl)(4-o-biphenyl 2-hexyl-indenyl)zirconium dichloride |

Thus, in a preferred embodiment of the invention, the catalyst precursor is selected from the group consisting of (6-methyl-8-phenyl-1,2,3-hydroindacenyl)(7-(4-tert-butyl-phenyl)-2-isopropyl indenyl) dimethylsilyl]zirconium dichloride, rac-dimethylsilyl bis(2-cyclopropyl-4-(3',5'-di-tert-butylphenyl)-indenyl) zirconium dichloride, rac-dimethylsilyl bis(2-methyl-4-phenyl-indenyl) zirconium dimethyl, rac-dimethylsilyl bis(2-methyl-4-(3',5'-di-tert-butyl-4'-methoxy-phenyl)-indenyl) zirconium dichloride, rac-dimethylsilyl[(4-(4'-tert-butylphenyl)-2-isopropylindenyl)(4-(4'-tert-butylphenyl)-2-methylindenyl)] zirconium dimethyl, rac-dimethylsilyl(4-o-biphenyl-2-(1-methylcyclohexyl)methyl-indenyl)(4-(3',5'-di-tert-butylphenyl)-2-methyl-indenyl)zirconium dichloride, rac-dimethylsilyl bis(2-cyclopropyl-4-(3',5'-di-tert-butylphenyl)-indenyl) hafnium dichloride, rac-pentamethylenesilylene-bis(2,4,7-trimethylindenyl)hafnium(IV) dimethyl, and rac-dimethylsilyl(4-(3',5'-di-tert-butyl-4'-methoxy-phenyl)-2-methyl indenyl)(4-o-biphenyl 2-hexyl-indenyl)zirconium dichloride.

In a preferred embodiment of the invention, M is a group 4 metal, $R^4$ and $R^{10}$ are, independently, an aromatic or substituted aromatic group, $R^2$ and $R^8$ are, independently, a non-aromatic hydrocarbyl or substituted hydrocarbyl, and T is a silyl-based bridging group.

In a preferred embodiment of the invention, $R^4$ and $R^{10}$ comprise benzene.

In some embodiments of the invention, two or more different catalyst compounds are present in the catalyst systems used herein. In some embodiments, two or more different catalyst systems are present in the reaction zone where the process(es) described herein occur. When two transition metal compound based catalysts are used in one reactor as a mixed catalyst system, the two transition metal compounds should be chosen such that the two are compatible. A simple screening method such as by $^1H$ or $^{13}C$ NMR, known to those of ordinary skill in the art, can be used to determine which transition metal compounds are compatible.

In embodiments of the invention where two or more different catalyst compounds are present, two transition metal compounds (pre-catalysts) may be used in any ratio. Preferred molar ratios of (A) transition metal compound to (B) transition metal compound fall within the range of (A:B) 1:1000 to 1000:1, alternatively 1:100 to 500:1, alternatively 1:10 to 200:1, alternatively 1:1 to 100:1, and alternatively 1:1 to 75:1, and alternatively 5:1 to 50:1. The particular ratio chosen will depend on the exact pre-catalysts chosen, the method of activation, and the end product desired. In a particular embodiment, when using the two pre-catalysts, where both are activated with the same activator, Useful mole percentages, based upon the molecular weight of the pre-catalysts, are 10 to 99.9 mol % A to 0.1 to 90 mol % B, alternatively 25 to 99 mol % A to 0.5 to 50 mol % B, alternatively 50 to 99 mol % A to 1 to 25 mol % B, and alternatively 75 to 99 mol % A to 1 to 10 mol % B.

In any of the formulas herein, M may be Zr or Hf and/or each X may be, independently, selected from the group consisting of hydrocarbyl radicals having from 1 to 20 carbon atoms, hydrides, amides, alkoxides, sulfides, phosphides, halides, dienes, amines, phosphines, ethers, and a combination thereof, (two X's may form a part of a fused ring or a ring system), preferably each X is independently selected from halides and $C_1$ to $C_5$ alkyl groups, preferably each X is a methyl group.

In embodiments of the invention, each $R^3$, $R^5$, $R^6$, $R^7$, $R^9$, $R^{11}$, $R^{12}$, or $R^{13}$ is, independently, hydrogen or a substituted hydrocarbyl group or unsubstituted hydrocarbyl group, or a heteroatom, preferably hydrogen, methyl, ethyl, propyl, butyl, pentyl, hexyl, or an isomer thereof.

In embodiments of the invention, each $R^3$, $R^4$, $R^5$, $R^6$, $R^7$, $R^9$, $R^{10}$, $R^{11}$, $R^{12}$, or $R^{13}$ is, independently selected from hydrogen, methyl, ethyl, phenyl, benzyl, cyclobutyl, cyclopentyl, cyclohexyl, naphthyl, anthracenyl, carbazolyl, indolyl, pyrrolyl, cyclopenta[b]thiopheneyl, fluoro, chloro, bromo, iodo, and isomers of propyl, butyl, pentyl, hexyl, heptyl, octyl, nonyl, decyl, methylphenyl, dimethylphenyl, ethylphenyl, diethylphenyl, propylphenyl, dipropylphenyl, butylphenyl, dibutylphenyl, methylbenzyl, methylpyrrolyl, dimethylpyrrolyl, methylindolyl, dimethylindolyl, methylcarbazolyl, dimethylcarbazolyl, methylcyclopenta[b]thiopheneyl dimethylcyclopenta[b]thiopheneyl.

In embodiments of the invention, T is a bridging group and comprises Si, Ge, or C, preferably T is dialkyl silicon or dialkyl germanium, preferably T is dimethyl silicon.

In embodiments of the invention, T is a bridging group and is represented by R'$_2$C, R'$_2$Si, R'$_2$Ge, R'$_2$CCR'$_2$, R'$_2$CCR'$_2$CR'$_2$, R'$_2$CCR'$_2$CR'$_2$CR'$_2$, R'C=CR', R'C=CR'CR'$_2$, R'$_2$CCR'=CR'CR'$_2$, R'C=CR'CR'=CR', R'C=CR'CR'$_2$CR'$_2$, R'$_2$CSiR'$_2$, R'$_2$SiSiR'$_2$, R$_2$CSiR'$_2$CR'$_2$, R'$_2$SiCR'$_2$SiR'$_2$, R'C=CR'SiR'$_2$, R'$_2$CGeR'$_2$, R'$_2$GeGeR'$_2$, R'$_2$CGeR'$_2$CR'$_2$, R'$_2$GeCR'$_2$GeR'$_2$, R'$_2$SiGeR'$_2$, R'C=CR'GeR'$_2$, R'B, R'$_2$C—BR', R'$_2$C—BR'—CR'$_2$, R'$_2$C—O—CR'$_2$, R'$_2$CR'$_2$C—O—CR'$_2$CR'$_2$, R'$_2$C—O—CR'$_2$CR'$_2$, R'$_2$C—O—CR'=CR', R'$_2$C—S—CR'$_2$, R'$_2$CR'$_2$C—S—CR'$_2$CR'$_2$, R'$_2$C—S—CR'$_2$CR'$_2$, R'$_2$C—S—CR'=CR', R'$_2$C—Se—CR'$_2$, R'$_2$CR'$_2$C—Se—CR'$_2$CR'$_2$, R'$_2$C—Se—CR'$_2$CR'$_2$, R'$_2$C—Se—CR'=CR', R'$_2$C—N=CR', R'$_2$C—NR'—CR'$_2$, R'$_2$C—NR'—CR'$_2$CR'$_2$, R'$_2$C—NR'—CR'=CR', R'$_2$CR'$_2$C—NR'—CR'$_2$CR'$_2$, R'$_2$C—P=CR', or R'$_2$C—PR'—CR'$_2$, where each R' is, independently, hydrogen or a $C_1$ to $C_{20}$ containing hydrocarbyl, substituted hydrocarbyl, halocarbyl, substituted halocarbyl, silylcarbyl or germylcarbyl substituent, and optionally, two or more adjacent R' may join to form a substituted or unsubstituted, saturated, partially unsaturated or aromatic, cyclic or polycyclic substituent. Preferably, T is $CH_2$, $CH_2CH_2$, $C(CH_3)_2$, $SiMe_2$, $SiPh_2$, $SiMePh$, silylcyclobutyl (Si(CH$_2$)$_3$), (Ph)$_2$C, (p-(Et)$_3$SiPh)$_2$C, cyclopentasilylene (Si(CH$_2$)$_4$), or Si(CH$_2$)$_5$.

In embodiments of the invention, R$^2$ and R$^8$ are, independently, a C$_1$ to C$_{20}$ hydrocarbyl, or a C$_1$ to C$_{20}$ substituted hydrocarbyl, C$_1$ to C$_{20}$ halocarbyl, C$_1$ to C$_{20}$ substituted halocarbyl, C$_1$ to C$_{20}$ silylcarbyl, C$_1$ to C$_{20}$ substituted silylcarbyl, C$_1$ to C$_{20}$ germylcarbyl, or C$_1$ to C$_{20}$ substituted germylcarbyl substituents. Preferably, each R$^2$ and R$^8$, is independently, methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, isopropyl, and the like.

In embodiments of the invention, R$^4$ and R$^{10}$ are, independently, a substituted or unsubstituted aryl group. Preferred substituted aryl groups include aryl groups where a hydrogen has been replaced by a hydrocarbyl, or a substituted hydrocarbyl, halocarbyl, substituted halocarbyl, silylcarbyl, substituted silylcarbyl, germylcarbyl, or substituted germylcarbyl substituents, a heteroatom or heteroatom containing group.

In embodiments of the invention, R$^2$ and R$^8$ are a C$_1$ to C$_{20}$ hydrocarbyl, such as methyl, ethyl, propyl, butyl, pentyl, hexyl, heptyl, octyl, nonyl, decyl, undecyl, dodecyl or an isomer thereof, preferably cyclopropyl, cyclohexyl, (1-cyclohexyl methyl) methyl, or isopropyl; and R$^4$ and R$^{10}$ are independently selected from phenyl, naphthyl, anthracenyl, 2-methylphenyl, 3-methylphenyl, 4-methylphenyl, 2,3-dimethylphenyl, 2,4-dimethylphenyl, 2,5-dimethylphenyl, 2,6-dimethylphenyl, 3,4-dimethylphenyl, 3,5-dimethylphenyl, 2,4,5-trimethylphenyl, 2,3,4,5,6-pentamethylphenyl, 2-ethylphenyl, 3-ethylphenyl, 4-ethylphenyl, 2,3-diethylphenyl, 2,4-diethylphenyl, 2,5-diethylphenyl, 2,6-diethylphenyl, 3,4-diethylphenyl, 3,5-diethylphenyl, 3-isopropylphenyl, 4-isopropylphenyl, 3,5-di-isopropylphenyl, 2,5-di-isopropylphenyl, 2-tert-butylphenyl, 3-tert-butylphenyl, 4-tert-butylphenyl, 3,5-di-tert-butylphenyl, 2,5-di-tert-butylphenyl, cyclopropyl, cyclobutyl, cyclopentyl, cyclohexyl, carbazolyl, indolyl, pyrrolyl, or cyclopenta[b]thiopheneyl. In a preferred embodiment of the invention, R$^2$, R$^8$, R$^4$ and R$^{10}$ are as described in the preceding sentence and R$^3$, R$^5$, R$^6$, R$^7$, R$^9$, R$^{11}$, R$^{12}$, and R$^{13}$ are hydrogen.

Suitable single-site catalyst precursor compounds may be represented by the formula:

A$_e$MX$_{n-e}$;

or the formula:

TA$_2$MX$_{n-2}$;

wherein: e is 1 or 2; T is a bridging group between two A groups; each A is a substituted monocyclic or polycyclic ligand that is pi-bonded to M and optionally includes one or more ring heteroatoms selected from boron, a group 14 atom that is not carbon, a group 15 atom, or a group 16 atom, and when e is 2 each A may be the same or different, provided that at least one A is substituted with at least one cyclopropyl substituent directly bonded to any sp$^2$ carbon atom at a bondable ring position of the ligand, wherein the cyclopropyl substituent is represented by the formula:

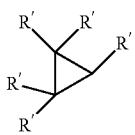

where each R' is, independently, hydrogen, a substituted or unsubstituted hydrocarbyl group, or a halogen; M is a transition metal atom having a coordination number of n and selected from group 3, 4, or 5, or a lanthanide metal atom, or actinide metal atom; n is 3, 4, or 5; and each X is a univalent anionic ligand, or two X's are joined and bound to the metal atom to form a metallocycle ring, or two X's are joined to form a chelating ligand, a diene ligand, or an alkylidene ligand.

The single-site catalyst precursor compound may also be represented by the formula:

T$_y$(A)$_e$(E)MX$_{n-e-1}$ where E is J-R''$_{x-1-y}$, J is a heteroatom with a coordination number of three from group 15 or with a coordination number of two from group 16; R'' is a C$_1$-C$_{100}$ substituted or unsubstituted hydrocarbyl radical; x is the coordination number of the heteroatom J where "x-1-y" indicates the number of R'' substituents bonded to J; T is a bridging group between A and E, A and E are bound to M, y is 0 or 1; and A, e, M, X and n are as defined above.

The single-site catalyst precursor compound may also be represented by one of the following formulas:

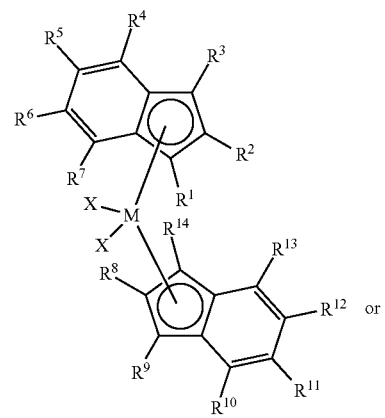

or

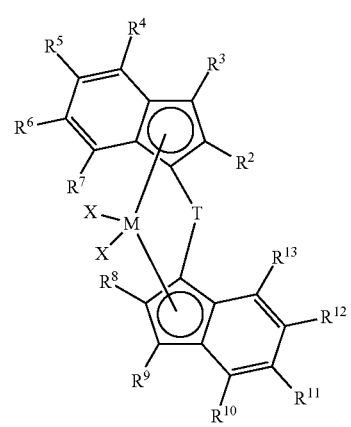

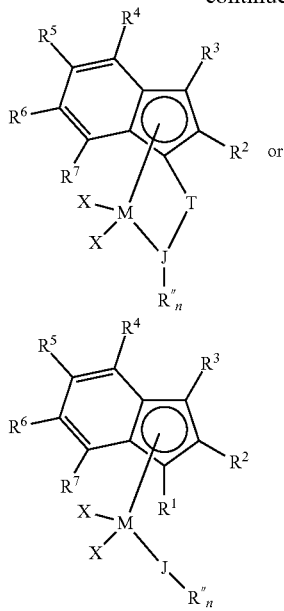

where M, T, X, J, R", and n are as defined above, and each $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is, independently, hydrogen, a substituted hydrocarbyl group, an unsubstituted hydrocarbyl group, or a halide, provided that in formula 1a and 1b, at least one of $R^1$, $R^2$, $R^3$, $R^4$, $R^5$, $R^6$, $R^7$, $R^8$, $R^9$, $R^{10}$, $R^{11}$, $R^{12}$, $R^{13}$, or $R^{14}$ is a cyclopropyl substituent and in formula 2a and 2b at least one of $R^1$, $R^2$, $R^3$, $R^4$, $R^5$, $R^6$, or $R^7$, is a cyclopropyl substituent; and provided that any adjacent $R^1$ to $R^{14}$ groups that are not a cyclopropyl substituent, may form a fused ring or multicenter fused ring system where the rings may be aromatic, partially saturated, or saturated.

In embodiments of the invention, at least one A is monocyclic ligand selected from the group consisting of substituted or unsubstituted cyclopentadienyl, heterocyclopentadienyl, and heterophenyl ligands provided that when e is one, the monocyclic ligand is substituted with at least one cyclopropyl substituent, at least one A is a polycyclic ligand selected from the group consisting of substituted or unsubstituted indenyl, fluorenyl, cyclopenta[a]naphthyl, cyclopenta[b]naphthyl, heteropentalenyl, heterocyclopentapentalenyl, heteroindenyl, heterofluorenyl, heterocyclopentanaphthyl, heterocyclopentaindenyl, and heterobenzocyclopentaindenyl ligands.

Single-site catalyst compounds suitable for use herein may further include one or more of: dimethylsilylene-bis(2-cyclopropyl-4-phenylindenyl)zirconium dichloride; dimethylsilylene-bis(2-cyclopropyl-4-phenylindenyl)hafnium dichloride; dimethylsilylene-bis(2-methyl-4-phenylindenyl) zirconium dichloride; dimethylsilylene-bis(2-methyl-4-phenylindenyl)hafnium dichloride; dimethylsilylene-bis(2-methyl-4-orthobiphenylindenyl)hafnium dichloride; dimethylsilylene-bis(2-methyl-4-orthobiphenylindenyl)zirconium dichloride; dimethylsilylene-(2-cyclopropyl-4-orthobiphenylindenyl)(2-methyl-4-3',5'-di-t-butylphenylindenyl)hafnium dichloride; dimethylsilylene-(2-cyclopropyl-4-orthobiphenylindenyl)(2-methyl-4-3',5'-di-t-butylphenylindenyl)zirconium dichloride; dimethylsilylene-(2-isopropyl-4(4-t-butyl)phenyl)indenyl) (2-methyl-4-phenyl indenyl) zirconium dichloride; dimethylsilylene-(2-isopropyl-4(4-t-butyl)phenyl)indenyl) (2-methyl-4-phenyl indenyl) hafnium dichloride; dimethylsilylene-(2-isopropyl-4(4-t-butyl)phenyl)indenyl) (2-methyl, 4-t-butylindenyl) zirconium dichloride; dimethylsilylene-(2-isopropyl-4(4-t-butyl)phenyl)indenyl) (2-methyl, 4-t-butylindenyl) hafnium dichloride; dimethylsilylene-(2-isopropyl-4(4-t-butyl)phenyl)indenyl) (2-methyl-4-phenylindacenyl) zirconium dichloride; dimethylsilylene-(2-isopropyl-4(4-t-butyl)phenyl)indenyl) (2-methyl-4-phenylindacenyl) hafnium dichloride; dimethylsilylene (4-o-Biphenyl-2-(1-methylcyclohexyl)methyl-indenyl) (4-(3,5-di-tert-butylphenyl)-2-methyl-indenyl) zirconium dichloride; and dimethylsilylene (4-o-Biphenyl-2-(1-methylcyclohexyl)methyl-indenyl) (4-(3,5-di-tert-butylphenyl)-2-methyl-indenyl) hafnium dichloride; where, in alternate embodiments, the dichloride in any of the compounds listed above may be replaced with dialkyl (such as dimethyl), dialkaryl, diflouride, diiodide, or dibromide, or a combination thereof.

The single-site catalyst precursor compound may also be represented by the formula (I):

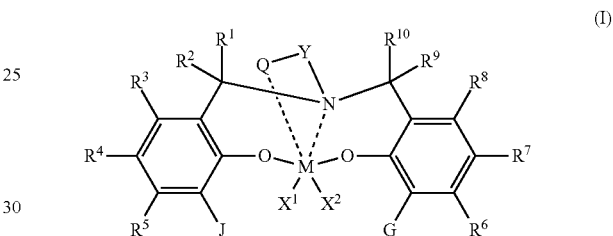

wherein M is a group 4 transition metal (preferably Hf, Zr, or Ti, preferably Hf or Zr);

$X^1$ and $X^2$ are, independently, a univalent $C_1$ to $C_{20}$ hydrocarbyl radical, a $C_1$ to $C_{20}$ substituted hydrocarbyl radical, a heteroatom or a heteroatom-containing group, or $X^1$ and $X^2$ join together to form a $C_4$ to $C_{62}$ cyclic or polycyclic ring structure (preferably benzyl, methyl, ethyl, chloro, bromo and the like);

each $R^1$, $R^2$, $R^3$, $R^4$, $R^5$, $R^6$, $R^7$, $R^8$, $R^9$, and $R^{10}$ is, independently, a hydrogen, a $C_1$ to $C_{40}$ hydrocarbyl radical, a substituted $C_1$ to $C_{40}$ hydrocarbyl radical, a heteroatom, a heteroatom-containing group (alternately each $R^1$, $R^2$, $R^3$, $R^4$, $R^5$, $R^6$, $R^7$, $R^8$, $R^9$, and $R^{10}$ may be a functional group comprising of elements from groups 13 to 17), or two or more of $R^1$ to $R^{10}$ may independently join together to form a $C_4$ to $C_{62}$ cyclic or polycyclic ring structure, or a combination thereof (preferably H, methyl, ethyl, propyl and the like);

Q is a neutral donor group, preferably a neutral donor group comprising at least one atom from group 15 or 16;

J is a $C_7$ to $C_{60}$ fused polycyclic (e.g., having at least 2 ring structures) group, which, optionally, comprises up to 20 atoms from groups 15 and 16, where at least one ring is aromatic and where at least one ring, which may or may not be aromatic, has at least 5 members (preferably J comprises a five-membered ring (which may be saturated or aromatic) that is fused to at least one other cyclic group and is preferably bound to the rest of the ligand through the five-membered ring);

G is, independently, as defined for J, a hydrogen, a $C_1$ to $C_{60}$ hydrocarbyl radical, a substituted hydrocarbyl radical, a heteroatom, or a heteroatom-containing group, or may independently form a $C_4$ to $C_{60}$ cyclic or polycyclic ring structure with $R^6$, $R^7$, or $R^8$ or a combination thereof; and Y is a divalent $C_1$ to $C_{20}$ hydrocarbyl or a substituted divalent hydrocarbyl group.

In particular embodiments, the catalyst compound may be represented by either formula (II) or (III) below:

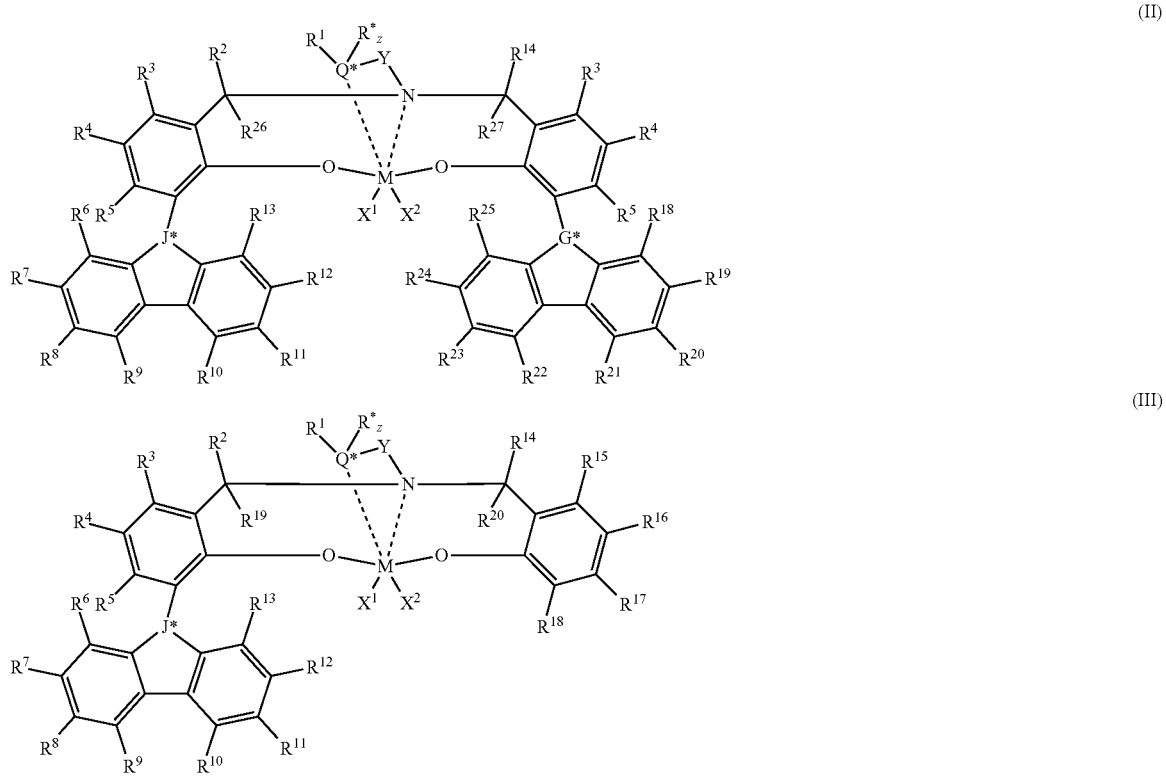

(II)

(III)

wherein M, $X^1$, $X^2$, $R^1$, $R^2$, $R^3$, $R^4$, $R^5$, $R^6$, $R^7$, $R^8$, $R^9$, $R^{10}$, and Y are as defined above with respect to formula (I);

Q* is a group 15 or 16 atom (preferably N, O, S or P);

z is 0 or 1;

J* is CR" or N;

G* is CR" or N; and each R", R*, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, as defined for $R^1$ above with respect to formula (I).

In any embodiment of the transition metal complexes described herein, M may be Hf, Ti or Zr.

In any embodiment of formulas (I), (II), and (III) described herein, each of $X^1$ and $X^2$ is independently selected from the group consisting of hydrocarbyl radicals having from 1 to 20 carbon atoms (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl), hydrides, amides, alkoxides having from 1 to 20 carbon atoms, sulfides, phosphides, halides, sulfoxides, sulfonates, phosphonates, nitrates, carboxylates, carbonates and combinations thereof, preferably each of $X^1$ and $X^2$ is independently selected from the group consisting of halides (F, Cl, Br, I), alkyl radicals having from 1 to 7 carbon atoms (methyl, ethyl, propyl, butyl, pentyl, hexyl, heptyl, and isomers thereof), benzyl radicals, or a combination thereof.

In any embodiment of formulas (I), (II), and (III) described herein, Y is a divalent $C_1$ to $C_{40}$ hydrocarbyl radical or divalent substituted hydrocarbyl radical comprising a portion that comprises a linker backbone comprising from 1 to 18 carbon atoms linking or bridging between Q and N. In an embodiment, Y is a divalent $C_1$ to $C_{40}$ hydrocarbyl or substituted hydrocarbyl radical comprising a portion that comprises a linker backbone comprising from 1 to 18 carbon atoms linking Q and N wherein the hydrocarbyl comprises O, S, S(O), $S(O)_2$, $Si(R')_2$, P(R'), N or N(R'), wherein each R is independently a $C_1$ to $C_{18}$ hydrocarbyl. In an embodiment, Y is selected from the group consisting of ethylene (—$CH_2CH_2$—) and 1,2-cyclohexylene. In an embodiment, Y is —$CH_2CH_2CH_2$— derived from propylene. In an embodiment, Y is selected form the group consisting of $C_1$ to $C_{20}$ alkyl groups, such as divalent methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, and eicosyl.

In a particular embodiment of formulas (I), (II), and (III), each $R^1$, $R^2$, $R^3$, $R^4$, $R^5$, $R^6$, $R^7$, $R^8$, $R^9$, and $R^{10}$ is, independently, a hydrogen, a $C_1$ to $C_{20}$ hydrocarbyl radical, a substituted $C_1$ to $C_{20}$ hydrocarbyl radical, or two or more of $R^1$ to $R^{10}$ may independently join together to form a $C_4$ to $C_{62}$ cyclic or polycyclic ring structure, or a combination thereof.

In any embodiment of formulas (I), (II), and (III) described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, hydrogen, a halogen, a $C_1$ to $C_{30}$ hydrocarbyl radical, a $C_1$ to $C_{20}$ hydrocarbyl radical, or a $C_1$ to $C_{10}$ hydrocarbyl radical (such as methyl, ethyl, ethenyl and isomers of propyl, butyl, pentyl, hexyl, heptyl, octyl, nonyl, decyl, undecyl, dodecyl, tridecyl, tetradecyl, pentadecyl, hexadecyl, heptadecyl, octadecyl, nonadecyl, eicosyl).

In any embodiment of formulas (I), (II), and (III) described herein, each R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is, independently, a substituted $C_1$ to $C_{30}$ hydrocarbyl radical, a substituted $C_1$ to $C_{20}$ hydrocarbyl radical, or a substituted $C_1$ to $C_{10}$ hydrocarbyl radical (such as 4-fluorophenyl, 4-chlorophenyl, 4-bromophenyl, 4-methoxyphenyl, 4-trifluoromethylphenyl, 4-dimethylaminophenyl, 4-trimethylsilylphenyl, 4-triethylsilylphenyl, trifluoromethyl, fluoromethyl, trichloromethyl, chloromethyl, mesityl, methylthio, phenylthio, (trimethylsilyl)methyl, and (triphenylsilyl)methyl).

In an embodiment of formulas (I), (II), and (III) described herein, one or more of R*, R", $R^1$, $R^2$, $R^3$, $R^4$, $R^5$, $R^6$, $R^7$, $R^8$, $R^9$, $R^{10}$, $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, and $R^{27}$ is a methyl radical, a fluoride, chloride, bromide, iodide, methoxy, ethoxy, isopropoxy, trifluoromethyl, dimethylamino, diphenylamino, adamantyl, phenyl, pentafluorophenyl, naphthyl, anthracenyl, dimethylphosphanyl, diisopropylphosphanyl, diphenylphosphanyl, methylthio, and phenylthio or a combination thereof.

In any embodiment of formulas (I), (II), and (III) described herein, Q* is N, O, S, or P, preferably N, O, or S, preferably N or O, preferably N. In any embodiment of the transition metal complexes described herein, when Q* is a group 15 atom, z is 1, and when Q* is a group 16 atom, z is 0.

In any embodiment of formulas (I), (II), and (III) described herein, Q is preferably a neutral donor group comprising at least one atom from group 15 or 16, preferably Q is NR'$_2$, OR', SR', PR'$_2$, where R' is as defined for $R^1$ (preferably R' is methyl, ethyl, propyl, isopropyl, phenyl, cyclohexyl or linked together to form a five-membered ring such as pyrrolidinyl or a six-membered ring such as piperidinyl), preferably the -(-Q-Y—)— fragment can form a substituted or unsubstituted heterocycle which may or may not be aromatic and may have multiple fused rings (for example, see compound 7-Zr, 7-Hf in the examples below). In any embodiment of formulas (I), (II), and (III) described herein, Q is preferably an amine, ether, or pyridine.

In a particular embodiment of formulas (I), (II), and (III) described herein, G* and J* are the same, preferably G* and J* are N, alternately G* and J* are CR''', where each R''' is H or a $C_1$ to $C_{12}$ hydrocarbyl or substituted hydrocarbyl (such as methyl, ethyl, ethenyl and isomers of propyl, butyl, pentyl, hexyl, heptyl, octyl, nonyl, decyl, undecyl, dodecyl, trifluoromethylphenyl, tolyl, phenyl, methoxyphenyl, tertbutylphenyl, fluorophenyl, diphenyl, dimethylaminophenyl, chlorophenyl, bromophenyl, iodophenyl, (trimethylsilyl)phenyl, (triethylsilyl)phenyl, (triethylsilyl)methyl, (triethylsilyl)methyl). In a useful embodiment of formulas (I), (II), and (III) described herein G* and J* are different.

In a particular embodiment of formulas (I), (II), and (III) described herein, G and J are the same, preferably G and J are carbazolyl, substituted carbazolyl, indolyl, substituted indolyl, indolinyl, substituted indolinyl, imidazolyl, substituted imidazolyl, indenyl, substituted indenyl, indanyl, substituted indanyl, fluorenyl, or substituted fluorenyl. In a useful embodiment of formulas (I), (II), and (III) described herein G and J are different.

In an embodiment of formulas (I), (II), and (III) described herein, M is Zr or Hf; $X^1$ and $X^2$ are benzyl radicals; $R^1$ is a methyl radical; $R^2$ through $R^{27}$ are hydrogen; Y is ethylene (—CH$_2$CH$_2$—), Q*, G* and J* are N, and Rz* is methyl radical.

In an embodiment of formulas (I), (II), and (III) described herein, M is Zr or Hf; $X^1$ and $X^2$ are benzyl radicals; $R^4$ and $R^7$ are methyl radicals; $R^1$ through $R^3$, $R^5$ through $R^6$ and $R^8$ through $R^{10}$ are hydrogen; and Y is ethylene, (—CH$_2$CH$_2$—), Q is an N-containing group, G and J are carbazolyl or fluorenyl. In a preferred combination, G and J are carbazolyl and Q is an amine group; or, G and J are substituted fluorenyl and Q is an amine, ether or pyridine.

The catalyst compound may also be represented by either formulas (IV) and (V) below:

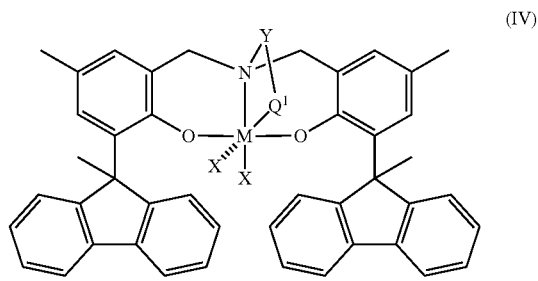

(IV)

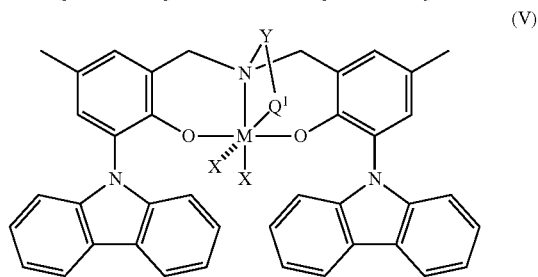

(V)

where Y is a $C_1$ to $C_3$ divalent hydrocarbyl, $Q^1$ is NR'$_2$, OR', SR', PR'$_2$, where R' is as defined for $R^1$ with respect to formulas (I), (II), and (III) above (preferably R' is methyl, ethyl, propyl, isopropyl, phenyl, cyclohexyl or linked together to form a five-membered ring such as pyrrolidinyl or a six-membered ring such as piperidinyl), alternately the -(-Q-Y—)— fragment can form a substituted or unsubstituted heterocycle which may or may not be aromatic and may have multiple fused rings, M is Zr, Hf or Ti and each X is, independently, as defined for $X^1$ above with respect to formulas (I), (II), and (III), preferably each X is benzyl, methyl, ethyl, chloride, bromide or alkoxide.

Chain Transfer Agents:

This invention further relates to methods to polymerize olefins using the above complex in the presence of a chain transfer agent ("CTA"). The CTA can be any desirable chemical compound such as those disclosed in WO 2007/130306. Preferably, the CTA is selected from Group 2, 12, or 13 alkyl or aryl compounds; preferably zinc, magnesium or aluminum alkyls or aryls; preferably where the alkyl is a $C_1$ to $C_{30}$ alkyl, alternately a $C_2$ to $C_{20}$ alkyl, alternately a $C_3$ to $C_{12}$ alkyl, typically selected independently from methyl, ethyl, propyl, butyl, isobutyl, tertbutyl, pentyl, hexyl, cyclohexyl, phenyl, octyl, nonyl, decyl, undecyl, and dodecyl; e.g., dialkyl zinc compounds, where the alkyl is selected independently from methyl, ethyl, propyl, butyl, isobutyl, tertbutyl, pentyl, hexyl, cyclohexyl, and phenyl, where diethylzinc is particularly preferred; or e.g., trialkyl aluminum compounds, where the alkyl is selected independently from methyl, ethyl, propyl, butyl, isobutyl, tertbutyl, pentyl, hexyl, cyclohexyl, and phenyl; or e.g., diethyl aluminum chloride, diisobutylaluminum hydride, diethylaluminum hydride, di-n-octylaluminum hydride, dibutylmagnesium, diethylmagnesium, dihexylmagnesium, and triethylboron.

Useful CTAs are typically present at from 10 or 20 or 50 or 100 equivalents to 600 or 700 or 800 or 1000 equivalents relative to the catalyst component. Alternately the CTA is preset at a catalyst complex-to-CTA molar ratio of from about 1:3000 to 10:1; alternatively 1:2000 to 10:1; alternatively 1:1000 to 10:1; alternatively, 1:500 to 1:1; alternatively 1:300 to 1:1; alternatively 1:200 to 1:1; alternatively 1:100 to 1:1; alternatively 1:50 to 1:1; or/and alternatively 1:10 to 1:1.

Monomers:

Monomers useful herein include substituted or unsubstituted $C_2$ to $C_{40}$ alpha olefins, $C_2$ to $C_{20}$ alpha olefins, $C_2$ to $C_{12}$ alpha olefins, preferably ethylene, propylene, butene, pentene, hexene, heptene, octene, nonene, decene, undecene, dodecene, and isomers thereof. In a preferred embodiment, the monomer comprises propylene and comonomer comprises one or more of ethylene or $C_4$ to $C_{40}$ olefins, $C_4$ to $C_{20}$ olefins, or $C_6$ to $C_{12}$ olefins. In another preferred embodiment, the monomer comprises ethylene and comonomer comprises one or more of propylene or $C_4$ to $C_{40}$ olefins, $C_4$ to $C_{20}$ olefins, or $C_6$ to $C_{12}$ olefins. The $C_4$ to $C_{40}$ olefin monomers may be linear, branched, or cyclic. The $C_4$ to $C_{40}$ cyclic olefins may be strained or unstrained, monocyclic or polycyclic, and may optionally include heteroatoms and/or one or more functional groups.

Exemplary $C_2$ to $C_{40}$ olefin monomers and co-monomers include ethylene, propylene, butene, pentene, hexene, heptene, octene, nonene, decene, undecene, dodecene, norbornene, norbornadiene, dicyclopentadiene, cyclopentene, cycloheptene, cyclooctene, cyclooctadiene, cyclododecene, 7-oxanorbornene, 7-oxanorbornadiene, substituted derivatives thereof, and isomers thereof, preferably hexene, heptene, octene, nonene, decene, dodecene, cyclooctene, 1,5-cyclooctadiene, 1-hydroxy-4-cyclooctene, 1-acetoxy-4-cyclooctene, 5-methylcyclopentene, cyclopentene, dicyclopentadiene, norbornene, norbornadiene, and their respective homologs and derivatives, preferably norbornene, norbornadiene, and dicyclopentadiene.

One or more dienes may be present in the polymer produced herein at up to 10 wt %, preferably at 0.00001 to 1.0 wt %, preferably 0.002 to 0.5 wt %, even more preferably 0.003 to 0.2 wt %, based upon the total weight of the composition. In some embodiments, 500 ppm or less of diene is added to the polymerization, 400 ppm or less, or 300 ppm or less. In other embodiments, at least 50 ppm of diene is added to the polymerization, or 100 ppm or more, or 150 ppm or more.

Diolefin monomers useful in this invention include any hydrocarbon structure, preferably $C_4$ to $C_{30}$, having at least two unsaturated bonds, wherein at least two of the unsaturated bonds are readily incorporated into a polymer by either a stereospecific or a non-stereospecific catalyst(s). The diolefin monomers may be selected from alpha, omega-diene monomers (i.e., di-vinyl monomers). The diolefin monomers may be linear di-vinyl monomers, most preferably those containing from 4 to 30 carbon atoms. Examples of preferred dienes include butadiene, pentadiene, hexadiene, heptadiene, octadiene, nonadiene, decadiene, undecadiene, dodecadiene, tridecadiene, tetradecadiene, pentadecadiene, hexadecadiene, heptadecadiene, octadecadiene, nonadecadiene, icosadiene, heneicosadiene, docosadiene, tricosadiene, tetracosadiene, pentacosadiene, hexacosadiene, heptacosadiene, octacosadiene, nonacosadiene, triacontadiene, particularly preferred dienes include 1,6-heptadiene, 1,7-octadiene, 1,8-nonadiene, 1,9-decadiene, 1,10-undecadiene, 1,11-dodecadiene, 1,12-tridecadiene, 1,13-tetradecadiene, and low molecular weight polybutadienes (Mw less than 1000 g/mol). Preferred cyclic dienes include cyclopentadiene, vinylnorbornene, norbornadiene, ethylidene norbornene, divinylbenzene, dicyclopentadiene, or higher ring containing diolefins with or without substituents at various ring positions.

The polymerization or copolymerization may be carried out using olefins such as ethylene, propylene, 1-butene, 1-hexene, 4-methyl-1-pentene, and 1-octene, vinylcyclohexane, norbornene and norbornadiene. In particular, propylene and ethylene are polymerized.

In a preferred embodiment of the invention, the monomer is propylene and the comonomer is ethylene. In another preferred embodiment of the invention, the monomer is ethylene and the comonomer is at least one $C_4$ to $C_8$ olefin.

Polymerization:

The polymers herein are prepared in a single reactor, preferably a gas phase fluidized bed reactor or a single tank autoclave reactor or loop reactor operating in slurry phase.

Slurry and gas phase polymerization processes are known in the art. As used herein, slurry polymerization processes are processes that utilize a supported catalyst and where at least 95 wt % of the polymer product derived from the supported catalyst is in granular form as solid particles upon exiting the reactor (not dissolved in the diluent). Gas phase polymerization processes are processes where the reactor is typically a fluidized bed comprising monomer and optionally comonomer, primarily in the gas phase and fluidized granular solid particles comprising catalyst components and polymer. Gas phase polymerization processes useful herein may be operated in either dry or condensed mode.

In preferred embodiments of the invention, no solvent or diluent is present or added in the reaction medium except for the small amounts used as the carrier for the catalyst system or other additives, or amounts typically found with the monomer; e.g., propane in propylene as is known in the art. The feed concentration of the monomers and comonomers for the polymerization may be 60 vol % solvent or less, 40 vol % or less, 20 vol % or less, 10 vol % or less, or 5 vol % or less, based on the total volume of the monomer and comonomer feedstreams.

Polymerizations can be run at any temperature and/or pressure suitable to obtain the desired polymers. Typical temperatures and/or pressures include a temperature greater than 30° C., greater than 50° C., greater than 65° C., greater than 70° C., or greater than 75° C., and less than 300° C., less than 200° C., less than 135° C., less than 120° C., or less than 115° C.; and/or pressures of less than 20 MPa, 10 MPa, 7 MPa, 5 MPa, or 2 MPa. Gas and slurry phase polymerization processes generally operate at lower temperatures. Thus, in preferred embodiments of the invention, the polymerization conditions comprise a temperature of from about 10° C. to less than 135° C., 130° C., 125° C., 120° C., or 115° C. Polymerization in any stage may include a reaction run time up to 300 minutes, or in the range of from about 5 to 250 minutes, or from about 10 to 120 minutes. In embodiments of the invention, in a continuous process the polymerization time for all stages is from 1 to 600 minutes, or 5 to 300 minutes, or from about 10 to 120 minutes.

Hydrogen and/or other CTA's may be added to the reactor to control Mw and melt flow rate (MFR) of the polymer produced. When used, hydrogen may be present in the polymerization reactor at a partial pressure of from 0.001 to 100 psig (0.007 to 690 kPa), or from 0.001 to 50 psig (0.007 to 345 kPa), or from 0.01 to 25 psig (0.07 to 172 kPa), or 0.1 to 10 psig (0.7 to 70 kPa). Staged hydrogen addition may be used, where hydrogen is added sequentially at different concentrations. For example, a lower concentration may be added for a period, followed by addition of a higher concentration, and vice versa.

Comonomer incorporation can be controlled in various ways. For example, catalyst precursors having high molecular weight polymer generating capabilities generally contribute to higher comonomer incorporation. Lower polymerization temperatures can also be used to increase comonomer incorporation. Likewise, use of a more porous support, having a larger average particle size and/or a narrower particle size distribution, can increase comonomer incorporation.

Other additives may also be used in the polymerization in any stage, as desired, such as one or more scavengers, promoters, modifiers, hydrogen, CTAs other than or in addition to hydrogen (such as diethyl zinc), reducing agents, oxidizing agents, aluminum alkyls, or silanes, or the like. In an embodiment of the invention, little or no scavenger is used in the polymerization in any stage to produce the polymer, i.e., scavenger (such as trialkyl aluminum) is present at a molar ratio of scavenger metal to transition metal of 0:1, alternately less than 100:1, or less than 50:1, or less than 15:1, or less than 10:1, or less than 1:1, or less than 0.1:1.

The reactor effluent in the processes disclosed herein comprises a granular polymer. In other words, the polymer is in solid, granular form in the reactor effluent that is withdrawn directly from the reactor. Gas and slurry phase polymerization processes are capable of producing reactor effluents comprising solid, granular polymers. In gas phase processes, the reactor effluent comprises solid, granular polymer without any substantial amount of solvent. In slurry phase polymerization processes, the reactor effluent typically comprises solid, granular polymer in a solvent-based slurry. In solution phase polymerization processes, on the other hand, the reactor effluent is a liquid comprising polymer in liquid form and a substantial amount of solvent that must be separated out in post-reactor separation processes.

In an embodiment of the invention, the productivity of the catalyst system in a single stage or in all stages combined is at least 50 g(polymer)/g(cat)/hour, preferably 500 or more g(polymer)/g(cat)/hour, preferably 800 or more g(polymer)/g(cat)/hour, preferably 5000 or more g(polymer)/g(cat)/hour, preferably 7500 or more g(polymer)/g(cat)/hour. In an embodiment of the invention, the activity of the catalyst system in a single stage or in all stages combined is at least 50 kg P/mol cat, preferably 500 or more kg P/mol cat, preferably 5000 or more kg P/mol cat, preferably 7500 or more kg P/mol cat.

Polymer Products:

The processes described herein can produce a variety of free-flowing polymers, including propylene-based RCPs and plastomers, both having low melting temperatures, in low cost processes like gas and slurry phase polymerization processes.

In a preferred embodiment of the invention, the olefin polymers produced are ethylene-based plastomers with a relatively high amount of comonomer incorporation. For example, the ethylene-based plastomers may comprise at least 80 mol %, 85 mol %, or 90 mol % ethylene and from 10 to 20 mol % of a $C_3$ to $C_{12}$ or a $C_4$ to $C_{10}$ comonomer, based on the total moles of monomer and comonomer in the plastomer.

In another preferred embodiment of the invention, the olefin polymers produced are propylene-based RCPs and comprise at least 95 mol % propylene and from 3 to 5 mol % ethylene, based on the total moles of propylene and ethylene in the RCP.

In another preferred embodiment of the invention, the olefin polymers have a melting temperature (Tm, DSC peak second melt) of less than or equal to 140° C., 135° C., 130° C., or 125° C. In another preferred embodiment of the invention, the olefin polymers have a melting temperature (Tm, DSC peak second melt) of less than or equal to 110° C., 105° C., or 100° C.).

In another preferred embodiment of the invention, the olefin polymers have a density of less than 0.915, 0.910, 0.905, 0.900, or 0.890 g/cc. For example, the olefin polymers may have a density of from 0.860 to 0.910, 0.870 to 0.910, or 0.870 to 0.890 g/cc. Density may be measured using ASTM D1505.

The olefin polymers of the invention may have an MFR, ASTM D1238, Condition L, 230° C. and 2.16 kg, of from 0.01 to 900, 0.01 to 500, 0.01 to 300, or 0.01 to 100 g/10 min.

The olefin polymers of the invention may have a molecular weight (Mw, GPC-IR) of at least 400 kg/mol.

The olefin polymers of the invention may have a molecular weight distribution, Mw/Mn, determined by GPC from 1.5 to 20.

Dusting powers are sometimes used with sticky polymer compositions to prevent sticking or agglomeration of polymer particles and enhance flowability, and may be used with the polymer compositions produced herein. As used herein, a "dusting powder" is any substance applied to a polymer composition to prevent sticking or agglomeration or enhance flowability. The compositions described herein may be formed into particles, granules, pellets, or other forms and then dusted with a dusting powder. Suitable dusting powders include polyolefin powders, and preferably microfine polyolefin powders. The powders are often used at 0.01 to 10 wt %, 0.1 to 5 wt %, or 0.1 to 1 wt %, based on the weight the polymer composition. Suitable dusting powders include polyethylene (including but not limited to LDPE, LLDPE, MDPE, and HDPE), polypropylene, or ethylene vinyl acetate copolymers. A preferred dusting powder is made from polyethylene having a density of 0.91 to 0.96 g/cc or 0.915 to 0.925 g/cc and an MI of 1 to 100 dg/min or 5 to 50 dg/min. Dusting powders may have a mesh size of from 1 to 100, 5 to 100, or 10 to 70 and a median diameter of 5 to 2000 micron, 10 to 500 micron, 10 to 100 micron, or 15 to 25 micron. Useful polyolefin powders are available from Equistar Chemicals LP under the tradename MICROTHENE, including MICROTHENE F grades and MICROTHENE G grades, such as FN510, FN532, FA700, and FP-800. A particularly preferred microfine dusting powder is MICROTHENE FA709-00, which is a high density polyethylene powder (0.952 g/cc) having a reported MI of 10 dg/min, a reported melting point of 134° C., and an average particle size of 20 microns.

In preferred embodiments of the invention, the polymer compositions in granular or pelletized form are free-flowing, preferably without the use of dusting powder, which can be demonstrated or measured in several different ways as further explained below. The polymers may be free-flowing in the sense that no dusting powder is used or required for them to flow and not agglomerate, even after storage for a significant length of time. In preferred embodiments of the invention, the polymers are free-flowing in that after storage at RT for at least four months, they have a particle size distribution characterized by less than 10.0 wt %, 7.5 wt %, 5 wt %, 3 wt %, 1.5 wt %, 1.0 wt %, or 0.5 wt % of particles having a diameter of more than 4000 µm, based on the total wt % of particles in the polymer, and preferably without the application of any dusting powder. In preferred embodiments of the invention, the polymers are free-flowing in that they comprise from 3 to 10 mol %, 3 to 8 mol %, 3 to 5 mol %, or 3.5 to 5 mol % ethylene, based on the total moles of polymer and, after storage at RT for at least four months, have a particle size distribution characterized by less than 10.0 wt %, 7.5 wt %, 5 wt %, 3 wt %, 1.5 wt %, 1.0 wt %, or 0.5 wt % of particles having a diameter of more than 4000 µm, based on the total wt % of particles in the polymer, and preferably without the application of any dusting powder.

In preferred embodiments of the invention, the polymers in granular or pelletized form are free-flowing according to a flowability test. This test is designed to simulate both the internal geometry of a bulk rail car as well as a storage silo. Both geometries are simulated in a device that has a circular cross section and has an angled bottom. In this test, a cylindrical device would be used, (referred to as a test silo) which would have a cylindrical inner cavity having a 30 cm total length axially along a central axis, and 9 cm internal diameter radially disposed about that central axis. The cylinder inner cavity would be bound on a bottom side by a narrowing (frusta-conical) constriction radially disposed about the central axis to a diameter of 3 cm, and having an angle of 30° to the central axis. Approximately 500 g of particles or pellets would be placed in the test silo with the bottom covered with a bottom stopper. The test silo would then be placed in an oven for 3 days at a predefined temperature, typically about 43° C. The test silo would then be removed from the oven, the bottom stopper would be removed, and the time required for the test silo to empty of the pellets would be recorded. If the pellets empty in less than 5 minutes, the pellets would be considered free-flowing. If the pellets do not empty in less than 5 minutes (300 seconds), the test would be discontinued and the pellets adjudged not to be free-flowing.

In preferred embodiments of the invention, the polymers in granular or pelletized form are free-flowing according to a funnel test. The funnel test is conducted according to ASTM D1895 Method B, but modified to use a funnel having a 29 mm bottom opening as described further below. In particular, the test apparatus consisted of a funnel with removable bottom seal and a receiving bin. The funnel had a top inner diameter of 73 mm, with a bottom opening of 29 mm. The length of the cone-shape portion of the funnel was 50 mm. (ASTM D1895 Test Method B calls for a funnel having a 127 mm top inner diameter and a 25.4 mm bottom inner diameter with a frustoconical shape radially disposed about a central axis and extending 230 mm from the top to the bottom.) The testing procedure herein was as follows. First, the funnel was loaded with about 500 grams of particles. Then the bottom seal of the funnel was removed and simultaneously a timer was started. The timer was stopped when all of the pellets have flowed out of the funnel, and the time was recorded.

Preferably, the polymers are free-flowing both initially and after elevated temperature storage (e.g., storage at 120° F. for 7 days). For example, an initial pourability value prior to aging or storage of the particles of the present invention may be about 120 seconds or less, when determined according to ASTM D1895 Method B, modified to use a funnel having a 29 mm bottom opening. Preferably, the pourability value is about 60 seconds or less, about 30 seconds or less, about 10 seconds or less, about 5 seconds or less, or about 2 seconds or less, when determined according to ASTM D1895 Method B, modified to use a funnel having a 29 mm bottom opening. After aging of the particles at 120° F. for 7 days, the aged pourability value of the particles of the present invention may be about 300 seconds or less, when determined according to ASTM D1895 Method B, modified to use a funnel having a 29 mm bottom opening. Preferably, after aging the pourability value is about 200 seconds or less, about 100 seconds or less, about 50 seconds or less, about 30 seconds or less, or about 10 seconds or less, when determined according to ASTM D1895 Method B, modified to use a funnel having a 29 mm bottom opening.

The polymers produced herein may be combined with one or more additional polymers prior to being formed into a film, molded part, or other article. Other useful polymers include polyethylene, isotactic polypropylene, highly isotactic polypropylene, syndiotactic polypropylene, random copolymer of propylene and ethylene, and/or butene, and/or hexene, polybutene, ethylene vinyl acetate, LDPE, LLDPE, HDPE, ethylene vinyl acetate, ethylene methyl acrylate, copolymers of acrylic acid, polymethylmethacrylate or any other polymers polymerizable by a high-pressure free radical process, polyvinylchloride, polybutene-1, isotactic polybutene, ABS resins, ethylene-propylene rubber (EPR), vulcanized EPR, EPDM, block copolymer, styrenic block copolymers, polyamides, polycarbonates, PET resins, cross linked polyethylene, copolymers of ethylene and vinyl alcohol (EVOH), polymers of aromatic monomers such as polystyrene, poly-1 esters, polyacetal, polyvinylidine fluoride, polyethylene glycols, and/or polyisobutylene.

The blends may be formed using conventional equipment and methods, such as by dry blending the individual components and subsequently melt mixing in a mixer, or by mixing the components together directly in a mixer, such as, for example, a Banbury mixer, a Haake mixer, a Brabender internal mixer, or a single or twin-screw extruder, which may include a compounding extruder and a side-arm extruder used directly downstream of a polymerization process, which may include blending powders or pellets of the resins at the hopper of the film extruder. Additionally, additives may be included in the blend, in one or more components of the blend, and/or in a product formed from the blend, such as a film, as desired. Such additives are well known in the art, and can include, for example: fillers; antioxidants (e.g., hindered phenolics such as IRGANOX™ 1010 or IRGANOX™ 1076 available from Ciba-Geigy); phosphites (e.g., IRGAFOS™ 168 available from Ciba-Geigy); anti-cling additives; tackifiers, such as polybutenes, terpene resins, aliphatic and aromatic hydrocarbon resins, alkali metal and glycerol stearates, and hydrogenated rosins; UV stabilizers; heat stabilizers; anti-blocking agents; release agents; anti-static agents; pigments; colorants; dyes; waxes; silica; fillers; talc; and the like.

EXPERIMENTAL

All reactions were carried out under a purified nitrogen atmosphere using standard glovebox, high vacuum or Schlenk techniques, in a CELSTIR reactor unless otherwise noted. All solvents used were anhydrous, de-oxygenated and purified according to known procedures. All starting materials were either purchased from Aldrich and purified prior to use or prepared according to procedures known to those skilled in the art. Silica was obtained from PQ Corporation (PD 13054 and 14024) and AGC Chemicals Americas, Inc. (D150-60A, D100-100A, and D70-120A). MAO was obtained as a 30 wt % MAO in toluene solution from Albemarle (e.g., 13.6 wt % Al or 5.04 mmol/g). Deuterated solvents were obtained from Cambridge Isotope Laboratories (Andover, Mass.) and dried over 3 Å molecular sieves. All $^1$H NMR data were collected on a Broker AVANCE III 400 MHz spectrometer running Topspin™ 3.0 software at room temperature (RT) using tetrachloroethane-d$_2$ as a solvent (chemical shift of 5.98 ppm was used as a reference) for all materials.

Slurry and solvent liquid ratios are given as weight ratios relative to the starting silica material, e.g., raw silica or silica supported MAO and/or catalyst. For example, if it is stated "the silica was slurried in 5× toluene," it means that the silica was slurried in 5 g of toluene for every 1 g of silica.

Molecular Weight and Comonomer Composition with PolymerChar GPC-IR (GPC-4D):

The distribution and the moments of molecular weight (Mw, Mn, Mw/Mn, etc.) and the comonomer content were determined with high temperature Gel Permeation Chromatography (PolymerChar GPC-IR) equipped with a multiple-channel band filter based Infrared detector ensemble IR5, in which a broad-band channel was used to measure the polymer concentration while two narrow-band channels were used for characterizing composition. Three Agilent PLgel 10 μm Mixed-B LS columns were used to provide polymer separation. Aldrich reagent grade 1,2,4-trichlorobenzene (TCB) with 300 ppm antioxidant butylated hydroxytoluene (BHT) was used as the mobile phase. The TCB mixture was filtered through a 0.1 m Teflon filter and degassed with an online degasser before entering the GPC-IR instrument. The nominal flow rate was 1.0 mL/min and the nominal injection volume was 200 μL. The whole system including transfer lines, columns, and detectors were contained in an oven maintained at 145° C. A given amount of polymer sample was weighed and sealed in a standard vial with 80 μL of flow marker (heptane) added to it. After loading the vial in the auto sampler, polymer was automatically dissolved in the instrument with 8 mL of added TCB solvent. The polymer was dissolved at 160° C. with continuous shaking, generally for about 1 hour for polyethylene (PE) samples or 2 hours for polypropylene (PP) samples. The TCB densities used in the concentration calculation were 1.463 g/ml at RT and 1.284 g/ml at 145° C. The sample solution concentration was from 0.2 to 2.0 mg/ml, with lower concentrations being used for higher molecular weight samples.

The concentration, c, at each point in the chromatogram was calculated from the baseline-subtracted IR5 broadband signal, I, using the following equation:

$$c = \alpha I$$

where α is the mass constant determined with PE or PP standards. The mass recovery was calculated from the ratio of the integrated area of the concentration chromatography over elution volume and the injection mass, which is equal to the pre-determined concentration multiplied by injection loop volume.

The molecular weight was determined by combining a universal calibration relationship with the column calibration which was performed with a series of monodispersed polystyrene (PS) standards. The MW was calculated at each elution volume with following equation:

$$\log M_X = \frac{\log(K_{PS}/K_X)}{a_X + 1} + \frac{a_{PS}+1}{a_X+1} \log M_{PS}$$

where the variables with subscript "X" stand for the test sample while those with subscript "PS" stand for PS. In this method, $a_{PS}$=0.67 and $K_{PS}$=0.000175 while $a_X$ and $K_X$ were obtained from published literature. Specifically, a/K=0.695/0.000579 for PE and 0.705/0.0002288 for PP.

The comonomer composition was determined by the ratio of the IR detector intensity corresponding to CH$_2$ and CH$_3$ channel calibrated with a series of PE and PP homo/copolymer standards whose nominal value are predetermined by NMR or FTIR.

Melt Flow Rate (MFR):

MFR was measured as per ASTM D1238, condition L, at 230° C. and 2.16 kg load unless otherwise indicated.

Differential Scanning Calorimetry (DSC):

Peak crystallization temperature (T$_c$), peak melting temperature (T$_m$), heat of fusion (H$_f$) and glass transition temperature (Tg) are measured via differential scanning calorimetry (DSC) using a DSCQ200 unit. The sample is first equilibrated at 25° C. and subsequently heated to 220° C. using a heating rate of 10° C./min (first heat). The sample is held at 220° C. for 3 min. The sample is subsequently cooled down to –100° C. with a constant cooling rate of 10° C./min (first cool). The sample is equilibrated at –100° C. before being heated to 220° C. at a constant heating rate of 10° C./min (second heat). The exothermic peak of crystallization (first cool) is analyzed using the TA Universal Analysis software and the corresponding to 10° C./min cooling rate is determined. The endothermic peak of melting (second heat) is also analyzed using the TA Universal Analysis software and T$_m$ corresponding to 10° C./min heating rate is determined. Areas under the DSC curve are used to determine H$_f$, upon melting or H$_c$, upon crystallization, and Tg.

Calcination of Raw Silica:

Raw silica was calcined in a CARBOLITE Model VST 12/600 tube furnace using a EUROTHERM 3216P1 temperature controller, according to the following procedure. The controller was programmed with the desired temperature profile. A quartz tube was filled with 100 g silica, and a valve was opened and adjusted to flow the nitrogen through the tube so that the silica was completely fluidized. The quartz tube was then placed inside the heating zone of the furnace. The silica was heated slowly to the desired temperature and held at this temperature for at least 8 hours to allow complete calcination and removal of water or moisture. After the dehydration was complete, the quartz tube was cooled to ambient temperature. Calcined silica was recovered in a silica catcher, and collected into a glass container inside a dry box. Diffuse reflectance infrared Fourier transform spectroscopy (DRIFTS) was used as a quality control check. The silica properties and calcination conditions for the silicas used in the following examples are provided in Table 1.

Two calcination temperatures were used herein, 200° C. and 600° C. (see Tc in Table 1). The 200° C. calcination results in silica having a higher Si—OH concentration on the surface to chemically bind more MAO molecules. This can minimize MAO leaching that may cause reactor fouling, especially in slurry processes where a catalyst with high MAO loading is used. The 600° C. calcination results in less Si—OH concentration on the surface and reduces the local heat generated by the reaction of trimethyl aluminum (TMA) in MAO with the surface Si—OH groups. Heat generation should typically be limited for silica with small pores, e.g., <70 Å and lack of >100 Å distributions, to minimize expansion fragmentation of the supported MAO. When expansion fragmentation occurs, solid MAO-dominated particles form.

TABLE 1

Silica Properties and Calcination Temperature

| Support | Tc °C. | PS um | SA m²/g | PV mL/g |
|---|---|---|---|---|
| AGC D150-60A | 600 | 150 | 733 | 1.17 |
| PQ PD13054 | 600 | 130 | 671 | 1.11 |
| AGC D100-100A | 200 | 100 | 543 | 1.51 |
| PQ PD-14024 | 200 | 85 | 611 | 1.40 |
| AGC D70-120A | 200 | 70 | 450 | 1.64 |
| AGC D70-120A | 600 | 70 | 450 | 1.64 |

Tc—Calcination temperature;
PS—average particle size (from manufacturer);
SA—BET surface area (from manufacturer);
PV—pore volume (from manufacturer).

For comparison to similar catalysts supported on Grace Davison Silica 948, please see FIG. 3 in concurrently filed PCT Application PCT/US2016/034784 (published as WO2017/204830, entitled "Metallocene Catalyst Compositions and Polymerization Process Therewith"), which is fully incorporated herein by reference.

Finished Catalyst Preparation:

PQ PD-14024 silica as prepared above was used in the finished catalyst preparation example below, although each of the silicas prepared above are suitable for embodiments of the invention.

Raw materials used in this finished catalyst preparation example included silica (PD-14024 calcined at 200° C.), MAO 30% solution (Albemarle, Al=13.5%), MCN9 (see Table A for chemical name), toluene, pentane, and TIBAL. MCN9 was prepared a described in U.S. Ser. No. 15/570,809, filed Oct. 31, 2017 entitled "Supported Metallocene Catalyst Systems for Polymerization," (see metallocene synthesis examples) which is incorporated by reference herein in its entirety.

An Ace Glass Incorporated 4 L Jacketed Filter Reactor with Lauda Proline RP 1845 C cooling system in the drybox was used. Silica (340 g) and toluene (2040 g) were loaded into the reactor through a funnel. The agitator was turned on at 250 rpm and the cooling system was activated to cool the slurry to about −10° C. Once the slurry reached −10° C., the agitator was increased to 350 rpm. The MAO solution (864 g) was then added slowly over a 2 to 3 hour period, with the slurry temperature maintained at ←8° C. After MAO addition, the agitator was decreased to 250 rpm, and the slurry was agitated for 30 minutes at −10° C. After this, the temperature of the slurry was increased to 100° C. over about 45 to 60 minutes and then the slurry was agitated for about 3 hours at 250 rpm. The slurry was then cooled to 25° C. over a period of about 30 to 45 minutes. Neat TIBAL (33.35 g) was then added, and the slurry was agitated for 45 to 60 minutes. The agitator was then increased to 350 rpm, and solid MCN9 (10.12 g) was added over a period of about 15 minutes. Following the MCN9 addition, the agitator was reduced back to 250 rpm and maintained at that speed for about 2 hours. The slurry was then filtered and washed in 4× of toluene, followed by 2× hexane, and then dried under vacuum overnight to obtain 622 g of catalyst product with about 1.5 wt % toluene residue. This catalyst system was used in the RCP polymerization examples below.

RCP Polymerization:

RCPs were polymerized in a batch process using a 2 L lab scale autoclave reactor. Prior to each polymerization, the reactor was purged with nitrogen for 1 to 2 hours at about 110° C. Then 1 mL of TIBAL was added and the reactor was brought to the desired reaction temperature (see Table 2). The desired amount of ethylene was charged to the reactor (see Table 2), and then 60 mg of supported catalyst slurried in mineral oil (to 5 wt % solids) was flushed into the reactor using ~1000 mL liquid propylene. Reactor contents were then isolated and agitated at 400 rpm for the duration of the run (see Reaction Time in Table 2). After the polymerization, the reactor was depressurized by venting off remaining monomer, and the RCP polymer granules were removed from the reactor and characterized. The polymer yield, composition, and melt temperatures are provided in Table 2. The polymer was granular and free-flowing.

TABLE 2

RCP Polymerization Results

| Example | Reaction Temperature (° C.) | $C_2$ Charge (sccm) | Reaction Time (min) | Reaction Yield (g) | $C_2$ Composition in RCP (mol %) | Melt Temperature (° C.) |
|---|---|---|---|---|---|---|
| A | 70 | — | 34 | 250 | — | 151 |
| B | 70 | 1300 | 36 | 290 | 0.2 | 150 |
| C | 70 | 3200 | 38 | 260 | 0.6 | 147 |
| D | 70 | 6500 | 21 | 280 | 1.3 | 143 |
| E | 70 | 13100 | 40 | 150 | 2.9 | 135 |
| F | 65 | 25400 | 18 | 386 | 4.5 | 124 |

Figure 2:
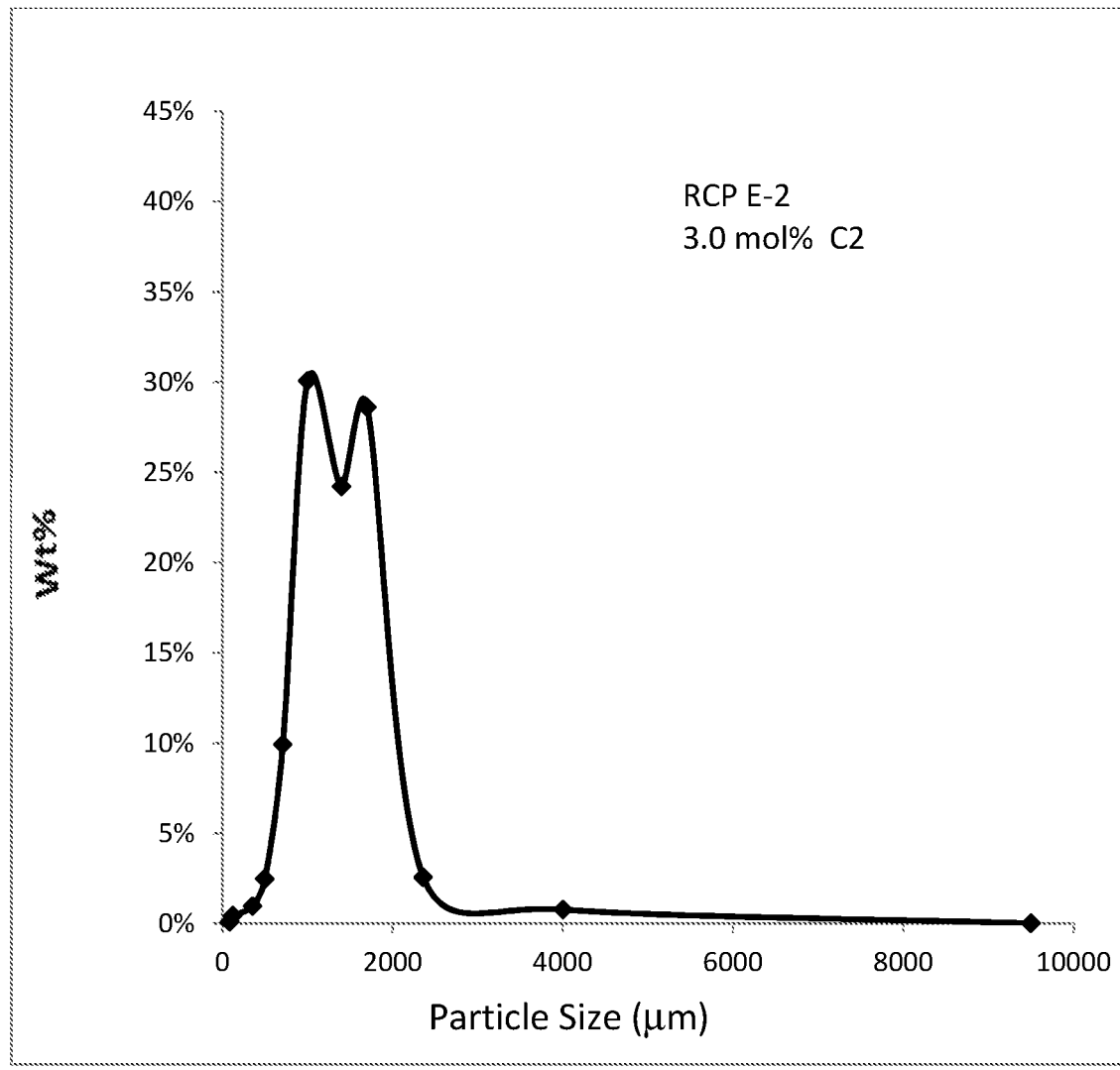
FIG. 2 provides another graph of wt % of polymer versus sieve size for a sieve experiment performed on a polymer produced as described in the experimental section.

The RCP of Example E in Table 2, containing about 3 mol % $C_2$, was reproduced three times under conditions as similar as possible to those described for Example E above. Two of these granular RCP samples, designated as RCP E-1 and RCP E-2 in Table 3 below, were sieved through a Meinzer II Sieve Shaker (commercially available from Advantech Manufacturing) to obtain the particle size distributions provided in Table 3 below. This was done after the polymers had been stored at RT for about four months. An eleven-sieve set with sizes of 90, 125, 335, 500, 710, 1000, 1400, 1700, 2360, 4000, and 9500 μm was used. Additionally, graphs of wt % of polymer versus sieve/particle size are provided as FIGS. 1 and 2.

TABLE 3

Particle Size Distributions for RCP E-1 and RCP E-2

| | Sample | | | | | |
|---|---|---|---|---|---|---|
| | RCP E-1 | | | RCP E-2 | | |
| Sieve Size (μm) | Wt (g) | Wt % | Total Wt % | Wt (g) | Wt % | Total Wt % |
| 90 | 0 | 0.00% | 0.00% | 0.1 | 0.08% | 0.08% |
| 125 | 0.16 | 0.24% | 0.24% | 0.53 | 0.43% | 0.51% |

TABLE 3-continued

Particle Size Distributions for RCP E-1 and RCP E-2

| Sieve Size (μm) | RCP E-1 | | | RCP E-2 | | |
|---|---|---|---|---|---|---|
| | Wt (g) | Wt % | Total Wt % | Wt (g) | Wt % | Total Wt % |
| 355 | 0.47 | 0.70% | 0.94% | 1.18 | 0.95% | 1.46% |
| 500 | 0.93 | 1.38% | 2.32% | 3.06 | 2.46% | 3.92% |
| 710 | 3.05 | 4.54% | 6.86% | 12.31 | 9.90% | 13.81% |
| 1000 | 19.81 | 29.48% | 36.34% | 37.37 | 30.05% | 43.86% |
| 1400 | 18.77 | 27.93% | 64.27% | 30.1 | 24.20% | 68.06% |
| 1700 | 15.46 | 23.01% | 85.89% | 35.59 | 28.62% | 94.22% |
| 2360 | 3.37 | 5.01% | 92.29% | 3.18 | 2.56% | 99.24% |
| 4000 | 2.44 | 3.63% | 95.92% | 0.95 | 0.76% | 100.00% |
| 9500 | 2.74 | 4.08% | 100.00% | 0 | 0.00% | 100.00% |
| Total (g) | 67.83 | | | 124.37 | | |

All documents described herein are incorporated by reference herein for purposes of all jurisdictions where such practice is allowed, including any priority documents, related application and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including." Likewise whenever a composition, an element or a group of elements is preceded with the transitional phrase "comprising," it is understood that we also contemplate the same composition or group of elements with transitional phrases "consisting essentially of," "consisting of," "selected from the group of consisting of," or "is" preceding the recitation of the composition, element, or elements and vice versa.

What is claimed is:

1. A method comprising:
   a. contacting a single-site catalyst precursor, an activator, and a support to produce a catalyst system, wherein the support comprises silica having an average surface area of from 400 m²/g to 800 m²/g and an average particle size of from 60 μm to 200 μm;
   b. contacting propylene monomer and ethylene monomer at a propylene to ethylene molar ratio of from 95:5 to 98:2, with the catalyst system in a single reactor under polymerization conditions, wherein the reactor is operated at a temperature of from about 10° C. to less than 135° C. to produce a reactor effluent; and
   c. recovering the reactor effluent comprising a granular polymer, wherein the granular polymer has a melting temperature, Tm (DSC second melt), of 135° C. or less, and an initial pourability value prior to aging or storage of about 120 seconds or less according to ASTM D1895 Method B, modified to use a funnel having a 29 mm bottom opening, a top inner diameter of 73 mm, and a length of the cone-shape portion of the funnel of 50 mm.

2. A method comprising:
   a. contacting a single-site catalyst precursor, an activator, and a support to produce a catalyst system, wherein the support comprises silica having an average surface area of from 400 m²/g to 800 m²/g and an average particle size of from 60 μm to 200 μm;
   b. contacting ethylene monomer and at least one $C_3$ to $C_{12}$ olefin comonomer at an ethylene to comonomer molar ratio of from 80:20 to 90:10, with the catalyst system in a single reactor under polymerization conditions, wherein the reactor is operated at a temperature from about 10° C. to less than 135° C. to produce a reactor effluent; and
   c. recovering the reactor effluent comprising a granular polymer, wherein the granular polymer has a melting temperature, Tm (DSC second melt), of 110° C. or less, and an initial pourability value prior to aging or storage of about 120 seconds or less according to ASTM D1895 Method B, modified to use a funnel having a 29 mm bottom opening, a top inner diameter of 73 mm, and a length of the cone-shape portion of the funnel of 50 mm.

3. The method of claim 1, wherein the single reactor is a gas phase fluidized bed reactor.

4. The method of claim 1, wherein the single reactor is a single tank autoclave reactor or a loop reactor, operating in slurry phase.

5. The method of claim 1, wherein the polymerization conditions comprise a temperature from about 60° C. to 90° C.

6. The method of claim 1, further comprising not adding carbon black to the single reactor.

7. The method of claim 1, wherein 500 grams of the polymer has an initial pourability value prior to aging or storage of about 60 seconds or less according to ASTM D1895 Method B, modified to use a funnel having a 29 mm bottom opening, a top inner diameter of 73 mm, and a length of the cone-shape portion of the funnel of 50 mm.

8. The method of claim 1, wherein the single-site catalyst precursor is represented by the formula:

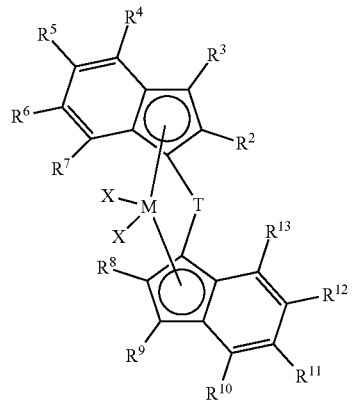

where M is a metal from group 4, 5 or 6;
T is a bridging group;
each X is, independently, an anionic leaving group;
each $R^2$, $R^3$, $R^4$, $R^5$, $R^6$, $R^7$, $R^8$, $R^9$, $R^{10}$, $R^{11}$, $R^{12}$, and $R^{13}$ is, independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a C$_1$-C$_{10}$ alkyl group, or a C$_6$-C$_{10}$ aryl group.

9. The method of claim 8, wherein M is a metal from group 4; R$^4$ and R$^{10}$ are, independently, an aromatic or substituted aromatic group; R$^2$ and R$^8$ are, independently, a non-aromatic hydrocarbyl or substituted hydrocarbyl; and T is a silyl-based bridging group.

10. The method of claim 8, wherein R$^4$ and R$^{10}$ are benzene or substituted benzene.

11. The method of claim 1, wherein the single-site catalyst precursor is selected from the group consisting of:
dimethylsilyl(6-methyl-8-phenyl-1,2,3-hydroindacenyl)(7-(4-tert-butylphenyl)-2-isopropyl indenyl) zirconium dichloride;
rac-dimethylsilyl bis(2-cyclopropyl-4-(3',5'-di-tert-butyl-phenyl)-indenyl) zirconium dichloride;
rac-dimethylsilyl bis(2-methyl-4-phenyl-indenyl) zirconium dimethyl;
rac-dimethylsilyl bis(2-methyl-4-(3',5'-di-tert-butyl-4'-methoxy-phenyl)-indenyl) zirconium dichloride;
rac-dimethylsilyl[(4-(4'-tert-butylphenyl)-2-isopropylindenyl)(4-(4'-tert-butylphenyl)-2-methylindenyl)] zirconium dimethyl;
rac-dimethylsilyl(4-o-biphenyl-2-(1-methylcyclohexyl)methyl-indenyl)(4-(3',5'-di-tert-butylphenyl)-2-methyl-indenyl)zirconium dichloride;
rac-dimethylsilyl bis(2-cyclopropyl-4-(3',5'-di-tert-butyl-phenyl)-indenyl) hafnium dichloride;
rac-pentamethylenesilylene-bis(2,4,7-trimethylindenyl) hafnium(IV) dimethyl; and
rac-dimethylsilyl(4-(3',5'-di-tert-butyl-4'-methoxy-phenyl)-2-methyl indenyl)(4-o-biphenyl 2-hexyl-indenyl) zirconium dichloride.

12. The method of claim 1, wherein the activator is an aluminoxane.

13. The method of claim 12, wherein the support in the catalyst system has an aluminoxane loading of at least 7 mmol Al/g silica.

14. The method of claim 2, wherein the single reactor is a gas phase fluidized bed reactor.

15. The method of claim 2, wherein the single reactor is a single tank autoclave reactor or a loop reactor, operating in slurry phase.

16. The method of claim 2, wherein the polymerization conditions comprise a temperature from about 60° C. to 90° C.

17. The method of claim 2, wherein carbon black is not added to the single reactor.

18. The method of claim 2, wherein 500 grams of the polymer has has an initial pourability value prior to aging or storage of about 30 seconds or less according to ASTM D1895 Method B, modified to use a funnel having a 29 mm bottom opening, a top inner diameter of 73 mm, and a length of the cone-shape portion of the funnel of 50 mm.

19. The method of claim 2, wherein the single-site catalyst precursor is represented by the formula:

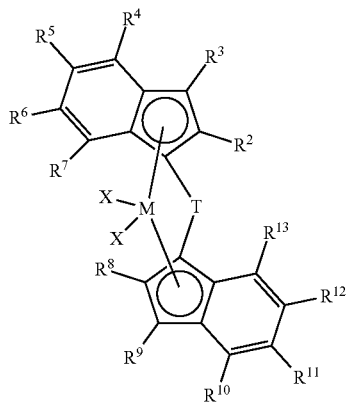

where M is a metal from group 4, 5 or 6;
T is a bridging group;
each X is, independently, an anionic leaving group;
each R$^2$, R$^3$, R$^4$, R$^5$, R$^6$, R$^7$, R$^8$, R$^9$, R$^{10}$, R$^{11}$, R$^{12}$, and R$^{13}$ is, independently, a halogen atom, hydrogen, hydrocarbyl, substituted hydrocarbyl, halocarbyl, substituted halocarbyl, silylcarbyl, substituted silylcarbyl, germylcarbyl, substituted germylcarbyl substituent or a —NR'$_2$, —SR', —OR', —OSiR'$_3$ or —PR'$_2$ radical, wherein R' is one of a halogen atom, a C$_1$-C$_{10}$ alkyl group, or a C$_6$-C$_{10}$ aryl group.

20. The method of claim 19, wherein M is a metal from group 4; R$^4$ and R$^{10}$ are, independently, an aromatic or substituted aromatic group; R$^2$ and R$^8$ are, independently, a non-aromatic hydrocarbyl or substituted hydrocarbyl; and T is a silyl-based bridging group.

21. The method of claim 20, wherein R$^4$ and R$^{10}$ are benzene or substituted benzene.

22. The method of claim 2, wherein the single-site catalyst precursor is selected from the group consisting of:
dimethylsilyl(6-methyl-8-phenyl-1,2,3-hydroindacenyl)(7-(4-tert-butylphenyl)-2-isopropyl indenyl) zirconium dichloride;
rac-dimethylsilyl bis(2-cyclopropyl-4-(3',5'-di-tert-butyl-phenyl)-indenyl) zirconium dichloride;
rac-dimethylsilyl bis(2-methyl-4-phenyl-indenyl) zirconium dimethyl;
rac-dimethylsilyl bis(2-methyl-4-(3',5'-di-tert-butyl-4'-methoxy-phenyl)-indenyl) zirconium dichloride;
rac-dimethylsilyl[(4-(4'-tert-butylphenyl)-2-isopropylindenyl)(4-(4'-tert-butylphenyl)-2-methylindenyl)] zirconium dimethyl;
rac-dimethylsilyl(4-o-biphenyl-2-(1-methylcyclohexyl)methyl-indenyl)(4-(3',5'-di-tert-butylphenyl)-2-methyl-indenyl)zirconium dichloride;
rac-dimethylsilyl bis(2-cyclopropyl-4-(3',5'-di-tert-butyl-phenyl)-indenyl) hafnium dichloride;
rac-pentamethylenesilylene-bis(2,4,7-trimethylindenyl) hafnium(IV) dimethyl; and
rac-dimethylsilyl(4-(3',5'-di-tert-butyl-4'-methoxy-phenyl)-2-methyl indenyl)(4-o-biphenyl 2-hexyl-indenyl) zirconium dichloride.

23. The method of claim 2, wherein the activator is an aluminoxane.

24. The method of claim 23, wherein the support in the catalyst system has an aluminoxane loading of at least 7 mmol Al/g silica.

25. The method of claim 1, wherein the polymer has a melting temperature, Tm (DSC second melt), of 130° C. or less.

26. The method of claim 2, wherein the polymer has a melting temperature, Tm (DSC second melt), of 105° C. or less.

27. The method of claim 1, wherein the polymer comprises at least 95 mol % propylene and from 3 to 5 mol % ethylene, based on the total moles of propylene and ethylene in the polymer, and has a melting temperature, Tm (DSC second melt), of less than or equal to 130° C. wherein after storage for at least four months, the polymer comprises a plurality of particles wherein less than 10.0 wt % of the particles have a diameter of more than 4000 µm, based on the total weight of the polymer.

28. The method of claim 2, wherein the polymer comprises at least 80 mol % ethylene and from 10 to 20 mol % of at least one $C_3$ to $C_{12}$ alpha-olefin comonomer, based on the total moles of ethylene and $C_3$ to $C_{12}$ alpha-olefin comonomer in the polymer, and has a melting temperature, Tm (DSC second melt), of less than or equal to 105° C. wherein after storage for at least four months, the polymer comprises a plurality of particles wherein less than 10.0 wt % of the particles have a diameter of more than 4000 µm, based on the total weight of the polymer.

29. The method of claim 1, wherein the support comprises silica and has:
 a) an average particle size of 65 µm to 180 µm;
 b) a pore volume of at least 0.1 mL/g;
 c) a surface area of 600 $m^2$/g to 800 $m^2$/g; and
 d) a mean pore diameter of 6 nm to 20 nm.

30. The method of claim 2, wherein the support comprises silica and has:
 a) an average particle size of 65 µm to 180 µm;
 b) a pore volume of at least 0.1 mL/g;
 c) a surface area of 600 $m^2$/g to 800 $m^2$/g; and
 d) a mean pore diameter of 6 nm to 20 nm.

* * * * *